United States Patent
Sakai et al.

(10) Patent No.: US 10,126,323 B2
(45) Date of Patent: Nov. 13, 2018

(54) CAPACITIVE PHYSICAL QUANTITY SENSOR

(71) Applicant: DENSO CORPORATION, Kariya, Aichi-pref. (JP)

(72) Inventors: Minekazu Sakai, Kariya (JP); Kiyomasa Sugimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 592 days.

(21) Appl. No.: 14/890,937

(22) PCT Filed: May 20, 2014

(86) PCT No.: PCT/JP2014/002636
§ 371 (c)(1),
(2) Date: Nov. 13, 2015

(87) PCT Pub. No.: WO2014/188705
PCT Pub. Date: Nov. 27, 2014

(65) Prior Publication Data
US 2016/0103149 A1    Apr. 14, 2016

(30) Foreign Application Priority Data

May 22, 2013   (JP) .................................. 2013-108259
Sep. 11, 2013   (JP) .................................. 2013-188181

(51) Int. Cl.
*G01P 21/00*    (2006.01)
*G01P 15/125*    (2006.01)
*G01P 15/08*    (2006.01)

(52) U.S. Cl.
CPC .......... *G01P 21/00* (2013.01); *G01P 15/0802* (2013.01); *G01P 15/125* (2013.01); *G01P 2015/088* (2013.01); *G01P 2015/0814* (2013.01)

(58) Field of Classification Search
CPC ........................ G01P 21/00; G01P 2015/0814
See application file for complete search history.

(56) References Cited

U.S. PATENT DOCUMENTS 4,122,708 A * 10/1978 Maier .................. G01D 5/2417
324/611
6,257,061 B1   7/2001 Nonoyama et al.
(Continued)

FOREIGN PATENT DOCUMENTS

JP    2008-107108 A    5/2008
JP    2010-185721 A    8/2010
(Continued)

OTHER PUBLICATIONS

International Search Report of the International Searching Authority dated Aug. 26, 2014 issued in the corresponding International application No. PCT/JP2014/002636 (and English translation).
(Continued)

*Primary Examiner* — Lisa Caputo
*Assistant Examiner* — Alex Devito
(74) *Attorney, Agent, or Firm* — Posz Law Group, PLC

(57) ABSTRACT

A capacitive physical quantity sensor includes a first substrate, a movable electrode, a fixed electrode, a second substrate, a signal applying unit, a C-V conversion circuit, and an auxiliary electrode. The auxiliary electrode is disposed from a portion of the second substrate which faces the movable electrode to a portion of the second substrate which faces a displaceable region of the movable electrode. The signal applying unit applies a predetermined potential to the auxiliary electrode at the time of self-diagnosis, to thereby increase a density of electric force lines generated between the fixed electrode located in a direction of displacing the movable electrode and the movable electrode.

8 Claims, 15 Drawing Sheets

(56) References Cited

U.S. PATENT DOCUMENTS

| 8,100,012 B2 | 1/2012 | Martin et al. |
| 2005/0066704 A1 | 3/2005 | Tanten et al. |
| 2012/0105080 A1 | 5/2012 | Iwasawa et al. |
| 2012/0167685 A1 | 7/2012 | Guo et al. |

FOREIGN PATENT DOCUMENTS

| JP | 2010-232431 A | 10/2010 |
| JP | 2012-163507 A | 8/2012 |
| JP | 2012-242201 A | 12/2012 |

OTHER PUBLICATIONS

Written Opinion of the International Searching Authority dated Aug. 26, 2014 issued in the corresponding International application No. PCT/JP2014/002636 (and English translation).

* cited by examiner

CAPACITIVE PHYSICAL QUANTITY SENSOR

CROSS REFERENCE TO RELATED APPLICATIONS

This application is a U.S. national phase of International Patent Application No. PCT/JP2014/002636 filed on May 20, 2014 and is based on Japanese Patent Application No. 2013-108259 filed on May 22, 2013 and Japanese Patent Application No. 2013-188181 filed on Sep. 11, 2013, the disclosures of which are incorporated herein by reference.

TECHNICAL FIELD

The present disclosure relates to a capacitive physical quantity sensor.

BACKGROUND ART

As an example of the capacitive physical quantity sensor, PTL 1 discloses an acceleration senor that is capable of performing self-diagnosis. The acceleration senor includes a movable electrode formed integrally with a beam part that is elastically displaced according to the application of acceleration, and a fixed electrode that is disposed to face the movable electrode. The acceleration senor also includes a signal supplying part that supplies, to the movable electrode and the fixed electrode, a diagnostic signal for self-diagnosis for generating an electrostatic force between the movable electrode and the fixed electrode to displace the movable electrode, at the time of the self-diagnosis.

In the acceleration senor described above, when a large acceleration of about 200 to 400 G is detected, the rigidity of the beam part is enhanced, and the beam part is hard to displace. For that reason, in the acceleration senor that detects the large acceleration, there arises such a problem that the amount of displacement of the movable electrode is reduced in association with an increase in the rigidity of the beam part at the time of the self-diagnosis. In other words, there arises such a problem that an output required for the self-diagnosis is difficult to obtain.

In the above example, the acceleration senor for detecting the acceleration is described. Even when the rigidity of the beam part increases in the capacitive physical quantity sensor such as an angular velocity sensor or a pressure sensor each having the movable electrode and the fixed electrode, the movable electrode is difficult to deform, and the same problem occurs.

PRIOR ART LITERATURE

Patent Literature

PTL 1: JP 2000-81449 A

SUMMARY OF INVENTION

The present disclosure aims at providing a capacitive physical quantity sensor that is capable of performing appropriate self-diagnosis regardless of a detection range.

According to an aspect of the present disclosure, a capacitive physical quantity sensor includes a first substrate, a movable electrode, a fixed electrode, a second substrate, a signal applying unit, a C-V conversion circuit, and an auxiliary electrode. The movable electrode is disposed adjacent to a surface of the first substrate, and formed integrally with a beam part which is displaceable in a predetermined direction in a planar direction of the surface by application of a physical quantity. The fixed electrode is disposed adjacent to the surface of the first substrate in a state to face the movable electrode. The second substrate is joined to the first substrate. The signal applying unit applies a diagnostic signal for self-diagnosis which displaces the movable electrode between the movable electrode and the fixed electrode at the time of the self-diagnosis. The C-V conversion circuit outputs a voltage corresponding to a change in a capacitance between the movable electrode and the fixed electrode when the diagnostic signal is applied to the movable electrode and the fixed electrode. The auxiliary electrode is disposed from a portion of the second substrate which faces the movable electrode to a portion of the second substrate which faces a displaceable region of the movable electrode.

During a normal operation, the capacitive physical quantity sensor outputs the voltage corresponding to the change in the capacitance between the fixed electrode and the movable electrode. During the self-diagnosis, the signal applying unit applies a predetermined potential to the auxiliary electrode to make a density of electric force lines generated between the fixed electrode located in a direction of displacing the movable electrode and the movable electrode higher than the density of electric force lines generated between the fixed electrode and the movable electrode during the normal operation.

In the capacitive physical quantity sensor, during the self-diagnosis, an electrostatic force generated between the fixed electrode located in a direction of displacing the movable electrode and the movable electrode can increase, and the displacement of the movable electrode can increase. For that reason, the capacitive physical quantity sensor can perform the appropriate self-diagnosis.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
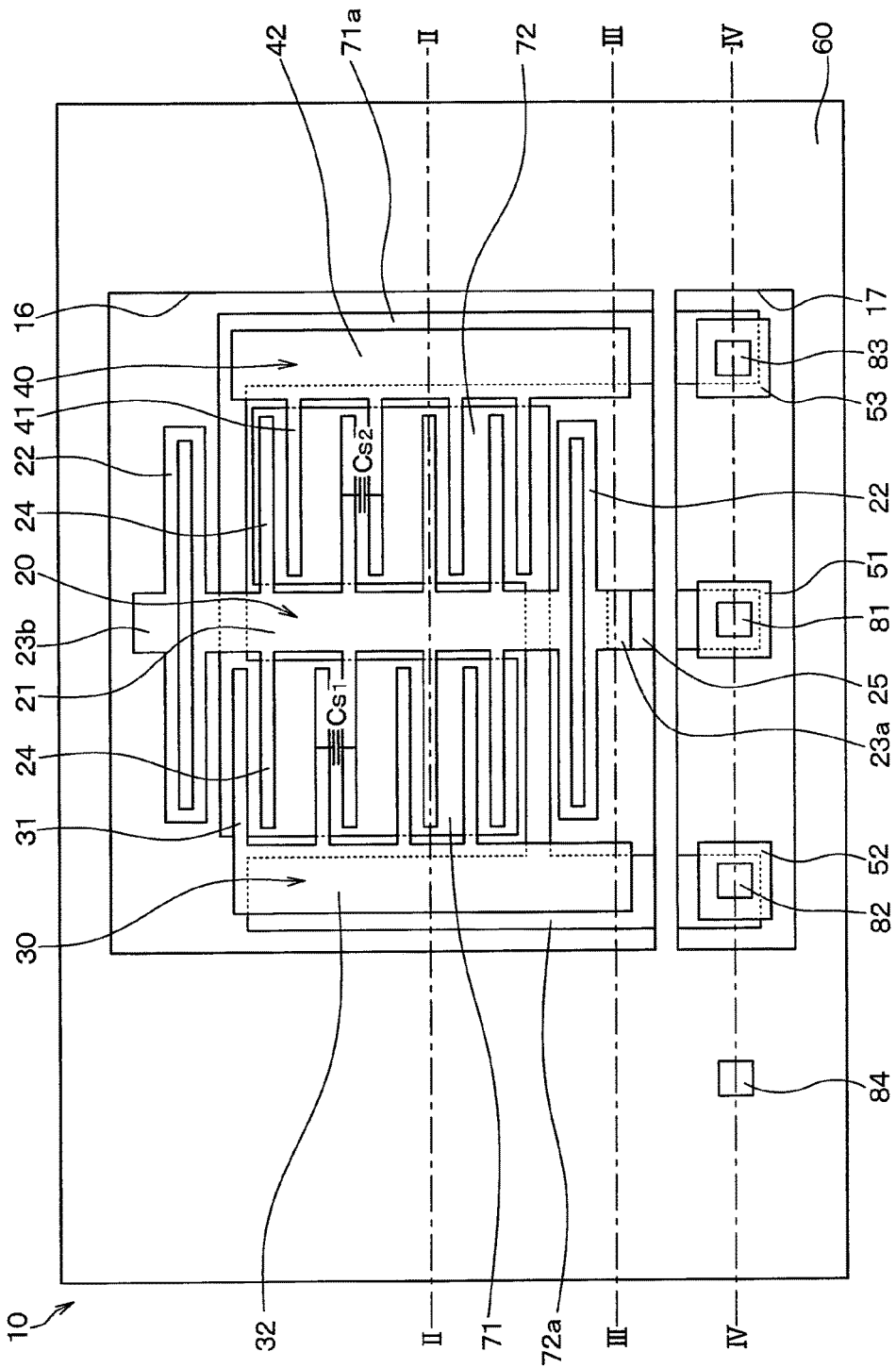
FIG. 1 is a top view of a sensor part of an acceleration sensor according to a first embodiment of the present disclosure.
Figure 2:
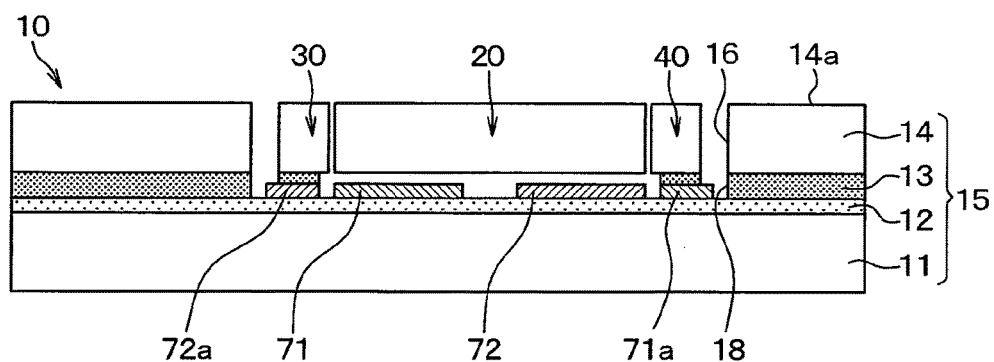
FIG. 2 is a cross-sectional view of the sensor part taken along a line II-II in FIG. 1.

Embodiments of the present disclosure will be described below with reference to the drawings. In the following respective embodiments, parts identical with or equivalent to each other are denoted by the same symbols for description.

(First Embodiment)

A first embodiment of the present disclosure will be described with reference to the drawings. In this embodiment, an example of a capacitive acceleration sensor having a capacitance changed according to acceleration will be described as a capacitive physical quantity sensor.

As illustrated in FIGS. 1 to 4, the acceleration sensor includes a sensor part 10 having a substrate 15 in which a semiconductor layer 14 is disposed over a support substrate 11 through first and second insulating films 12 and 13.

In this embodiment, the semiconductor layer 14 corresponds to a first substrate, and the support substrate 11 corresponds to a second substrate. The support substrate 11 is formed of, for example, a silicon substrate, the first and second insulating films 12 and 13 are made of $SiO_2$ or SiN, and the semiconductor layer 14 is made of polysilicon.

In the semiconductor layer 14, a movable part 20, and first and second fixed portions 30, 40 are partitioned on a side adjacent to one surface 14a by a first groove portion 16, and connection parts 51 to 53 are partitioned by a second groove portion 17. A portion of the semiconductor layer 14, which is not partitioned by the first and second groove portions 16 and 17, forms a peripheral part 60. The one surface 14a of the semiconductor layer 14 means a surface of the semiconductor layer 14 opposite to the second insulating film 13, and the one surface 14a of the semiconductor layer 14 corresponds to a surface of the first substrate.

The movable part 20 is configured such that both ends of a rectangular weight part 21 in a longitudinal direction are coupled integrally with anchor parts 23a and 23b through respective beam parts 22.

The anchor parts 23a and 23b are supported to the support substrate 11 through the first and second insulating films 12 and 13 within the first groove portion 16. In the second insulating film 13, a portion facing the movable part 20, and portions facing first and second fixed electrodes 31 and 41 to be described later are removed to define an opening 18. The movable part 20 and the first and second fixed electrodes 31, 41 are in a state to float from the support substrate 11.

Each of the beam parts 22 is shaped into a rectangular frame having two parallel beams coupled with each other at both ends of the beams, and has a spring function that the beam part 22 is displaced in a direction orthogonal to a longitudinal direction of those two beams. Specifically, when receiving acceleration including a component in a longitudinal direction of the weight part 21, the beam parts 22 displace the weight part 21 in the longitudinal direction, and restore the weight part 21 to an original state according to the loss of acceleration. Therefore, the weight part 21 coupled to the support substrate 11 through such beam parts 22 can be displaced in a displacement direction (longitudinal direction of the weight part 21) of the beam parts 22 according to the application of acceleration.

The movable part 20 includes multiple movable electrodes 24 which are protruded integrally in opposite directions to each other from both side surfaces of the weight part 21, in a direction orthogonal to a longitudinal direction of the weight part 21. Referring to FIG. 1, the movable electrodes 24 are protruded from a left side and a right side of the weight part 21 four by four, and face the opening 18. The respective movable electrodes 24 are formed integrally with the weight part 21 and the beam parts 22, and can be displaced in the longitudinal direction of the weight part 21 together with the weight part 21 with the displacement of the beam parts 22.

The movable part 20 is connected to a connection part 51 through a movable part line 25. Specifically, the movable part line 25 extends from a portion located immediately below the anchor part 23a to a portion located immediately below the connection part 51 in the first insulating film 12, and is formed in a rectangular shape in a top view. The anchor part 23a (movable part 20) and the connection part 51 are connected to the movable part line 25 through a contact hole 13a defined in the second insulating film 13.

The first and second fixed portions 30 and 40 are provided on first and second wiring parts 32 and 42. In the first and second wiring parts 32 and 42, the first and second fixed electrodes 31 and 41 are supported on the support substrate 11 through the first and second insulating films 12 and 13.

Specifically, the first and second fixed electrodes 31 and 41 are present at predetermined detection intervals from side surfaces of the respective movable electrodes 24. The first and second fixed electrodes 31 and 41 are supported by the first and second wiring parts 32 and 42 in a pectinate shape so as to be engaged with pectinate gaps of the movable electrodes 24, and face the opening 18. In more detail, in one movable electrode 24 and two first fixed electrodes 31 which are adjacent to each other through the movable electrode 24, an interval between one of the first fixed electrodes 31 and the movable electrode 24 is set to be smaller than an interval between the other first fixed electrode 31 and the movable electrode 24. Likewise, in one movable electrode 24 and two second fixed electrodes 41 which are adjacent to each other through the movable electrode 24, an interval between one of the second fixed electrodes 41 and the movable electrode 24 is set to be smaller than an interval between the other second fixed electrode 41 and the movable electrode 24. Shorter interval sides of the first and second fixed electrodes 31 and 41 to the movable electrodes 24 in the longitudinal direction of the weight part 21 (vertical direction on a paper plane in FIG. 1) are opposite to each other.

The first and second fixed portions 30 and 40 are disposed to interpose the weight part 21 between the first and second fixed portions 30 and 40. Referring to FIG. 1, the first fixed portion 30 is disposed on a left side of the paper surface with respect to the movable part 20, and the second fixed portion 40 is disposed on a right side of the paper surface with respect to the movable part 20.

In a portion of the first insulating film 12 from which the second insulating film 13 has been removed, which is in a displaceable region of the movable electrode 24, first auxiliary electrodes 71 or second auxiliary electrodes 72 are formed. In this embodiment, the first auxiliary electrodes 71 are formed to face the displaceable region of the movable electrodes 24 facing the first fixed electrodes 31, and the second auxiliary electrodes 72 are formed to face the displaceable region of the movable electrodes 24 facing the second fixed electrodes 41.

The first and second auxiliary electrodes 71 and 72 are formed on the first insulating film 12, and connected to connection parts 52 and 53 through first and second auxiliary electrode lines 71a and 72a. Specifically, the first auxiliary electrode line 71a is formed integrally with the first auxiliary electrode 71, passes through a portion facing the second wiring part 42, and extends immediately blow the connection part 53. The second auxiliary electrode line 72a is formed integrally with the second auxiliary electrode 72, passes through a portion facing the first wiring part 32, and extends immediately below the connection part 52.

The connection parts 52 and 53 are connected to the first and second auxiliary electrode lines 71a and 72a through the contact holes 13a defined in the second insulating film 13, respectively. Likewise, the first and second wiring parts 32 and 42 are connected to the first and second auxiliary electrode lines 71a and 72a through the contact holes 13a defined in the second insulating film 13, respectively. In other words, in this embodiment, the first fixed electrodes 31 and the second auxiliary electrodes 72 have the same potential, and the second fixed electrodes 41 and the first auxiliary electrodes 71 have the same potential.

Pads 81 to 84 are formed on the connection parts 51 to 53 and the peripheral part 60 in the semiconductor layer 14. The connection parts 51 to 53 and the peripheral part 60 are electrically connected to a circuit part 100 through the pads 81 to 84 via wires. A predetermined potential is applied to the pad 84 formed on the peripheral part 60 from the circuit part 100 for the purpose of fixing a potential of the peripheral part 60.

In the sensor part 10 of the above type, as described above, the first and second fixed electrodes 31 and 41 are formed in a pectinate shape so as to engage in pectinate gaps of the movable electrodes 24. As indicated by capacitor signs in FIG. 1, a capacitance CS1 is produced between each movable electrode 24 and the first fixed electrode 31 shorter in the interval to the movable electrode 24, and a capacitance CS2 is produced between the movable electrode 24 and the second fixed electrode 41 shorter in the interval to the movable electrode 24.

Figure 5:
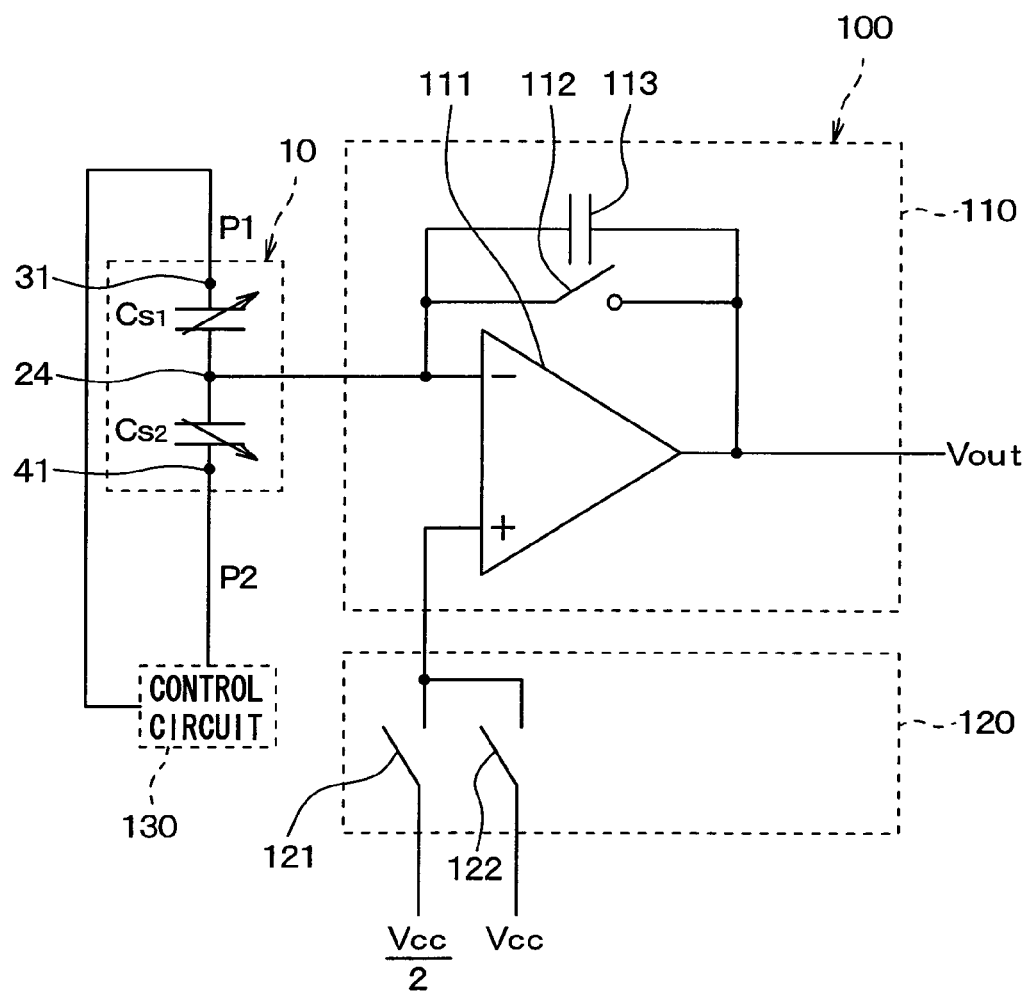
FIG. 5 is a diagram illustrating a circuit configuration of an acceleration sensor.

Subsequently, a circuit configuration of the acceleration sensor will be described with reference to FIG. 5. As illustrated in FIG. 5, the sensor part 10 is connected to the circuit part 100 having a C-V conversion circuit (switched capacitor circuit) 110, a switch circuit 120, and a control circuit 130. The C-V conversion circuit 110 converts the capacitances CS1 and CS2 between the movable electrodes 24 and the first and second fixed electrodes 31, 41 into voltages, and outputs the voltages. The C-V conversion circuit 110 includes an operational amplifier 111, a switch 112, and a capacitor 113.

Specifically, the operational amplifier 111 has an inverting input terminal connected to the movable electrode 24, and the switch 112 and the capacitor 113 are connected in parallel to each other between the inverting input terminal and the output terminal. The operational amplifier 111 receives any one of a voltage (potential) of Vcc/2 and a voltage (potential) of Vcc at a non-inverting input terminal through the switch circuit 120.

The switch circuit 120 inputs any one of a voltage of Vcc/2 and a voltage of Vcc from respective voltage sources not shown to the non-inverting input terminal of the operational amplifier 111 in the C-V conversion circuit 110. The switch circuit 120 includes a switch 121 and a switch 122. One of the switch 121 and the switch 122 is closed while the other switch is opened.

The control circuit 130 inputs a carrier P1 periodically changed with a constant amplitude V to the first fixed electrode 31, and also inputs a carrier P2 shifted in phase by 180° from the carrier P1 and having the same amplitude V as that of the carrier P1 to the second fixed electrode 41. The control circuit 130 outputs a control signal not shown for controlling open/close operation of the above switches 112, 121, and 122 at predetermined timing.

In this embodiment, the signal applying unit is configured by the switch circuit 120 and the control circuit 130.

Subsequently, the operation of the above acceleration senor will be described. First, the operation of the acceleration senor in the normal operation will be described.

Figure 6:
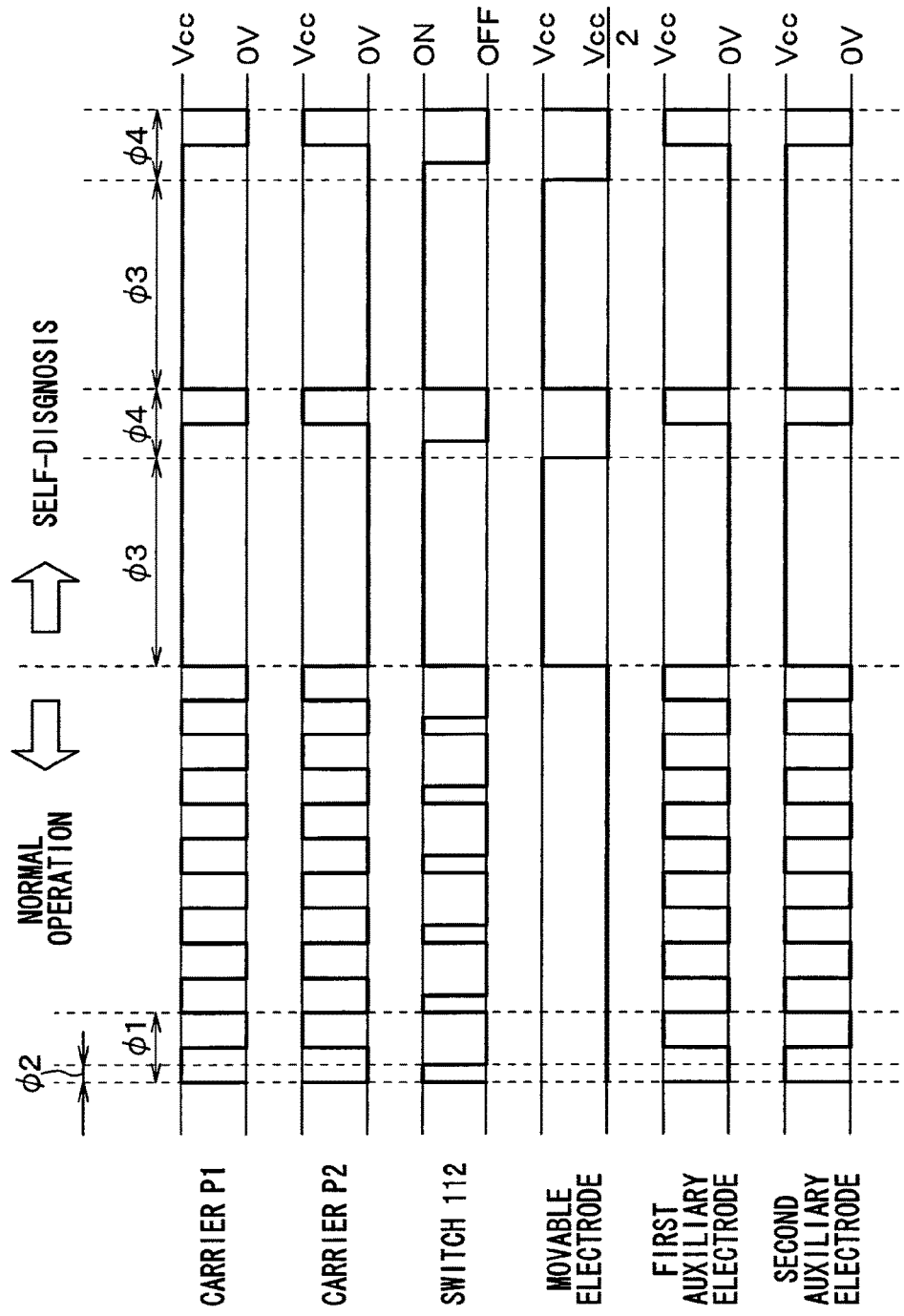
FIG. 6 is a timing chart of an acceleration sensor illustrated in FIG. 1.

As illustrated in FIG. 6, the carrier P1 (for example, 100 kHz in frequency, 0 to Vcc in amplitude) output from the control circuit 130 is a square wave signal having a constant amplitude in which a high level and a low level change with a period ϕ1 as one period (for example, 10 μs). The carrier P2 is a square wave signal having a voltage level inverted with respect to the carrier P1.

During the normal operation, when the above respective carriers P1 and P2 are applied to the first and second fixed electrodes 31 and 41, the switch 121 is closed and the switch 122 is opened in the switch circuit 120. In other words, with the application of the voltage of Vcc/2 to the non-inverting input terminal of the operational amplifier 111, a constant voltage (potential) of V/2cc is applied to the movable electrodes 24. As with the movable electrodes 24, the constant voltage (potential) of Vcc/2 is applied to the peripheral part 60 from the control circuit 130.

Although not particularly affected during the normal operation, the carrier P2 is applied to the first auxiliary electrode 71 as with the second fixed electrodes 41, and the carrier P1 is applied to the second auxiliary electrode 72 as with the first fixed electrodes 31.

When acceleration is not applied in that state, both of a potential difference between the movable electrodes 24 and the first fixed electrodes 31, and a potential difference between the movable electrodes 24 and the second fixed electrodes 41 are Vcc/2. In other words, an electrostatic force between the movable electrodes 24 and the first fixed electrodes 31 is substantially equally balanced with an electrostatic force between the movable electrodes 24 and the second fixed electrodes 41.

During the normal operation, in the C-V conversion circuit 110, the switch 112 is opened and closed at timing illustrated in FIG. 6. When the switch 112 is closed (ON in FIG. 6) (period ϕ2), the capacitor 113 is reset. On the other hand, when the switch 112 is opened (OFF in FIG. 6), acceleration is detected. In other words, a period in the period ϕ1 except for the period ϕ2 is a period for detecting the acceleration. In the detection period, an output voltage Vout from the C-V conversion circuit 110 is represented by the following Mathematical Expression 1.

$$Vout=(CS1-CS2)\cdot Vx/Cf \quad (Ex.\ 1)$$

Vx is a voltage between the first and second fixed electrodes 31 and 41, and Cf is a capacitance of the capacitor 113.

When acceleration is applied in that state, a balance of the capacitances CS1 and CS2 is changed. For that reason, a voltage corresponding to a capacitance difference (CS1−CS2) is output to the output Vout as a voltage added as a bias on the basis of the above Mathematical Expression 1.

Next, the operation of the acceleration senor in the self-diagnosis will be described.

During the self-diagnosis, as illustrated in FIG. 6, the carriers P1 and P2 which are square wave signals having the constant amplitude V are applied to the first and second fixed electrodes 31 and 41 by the control circuit 130. Likewise, the carrier P2 is applied to the first auxiliary electrode 71 as with the second fixed electrodes 41, and the carrier P1 is applied to the second auxiliary electrode 72 as with the first fixed electrodes 31.

In a period ϕ3 (for example, 100 μs), the carrier P1 and the carrier P2 are constant voltage signals (for example, carrier P1 is Vcc, and carrier P2 is 0 V) whose voltage levels are inverted from each other.

In the period ϕ3, the switch 121 is opened, and the switch 122 is closed in the switch circuit 120. For that reason, a voltage (potential) of Vcc is applied to the non-inverting input terminal of the operational amplifier 111, and a voltage (potential) of Vcc is applied to the movable electrodes 24.

When the voltage of Vcc is applied to the movable electrodes 24, the electrostatic forces are unbalanced during the normal operation, and the movable electrodes 24 are attracted to any one of the first and second fixed electrodes 31 and 41, which is larger in the potential difference from the movable electrodes 24.

For example, in the period of ϕ3 illustrated in FIG. 6, the voltage (potential) of Vcc is applied to the first fixed electrode 31, and the voltage (potential) of 0 V is applied to the second fixed electrode 41. For that reason, the beam part 22 is flexed so that the movable electrode 24 is attracted to the second fixed electrode 41 larger in the potential difference, to thereby be displaced toward the second fixed electrode 41 integrally with the beam part 22.

In this case, the second fixed electrode 41 means the second fixed electrode 41 configuring the movable electrode 24 and the capacitance CS2. In other words, that the movable electrode 24 is displaced toward the second fixed electrode 41 means that the movable electrode 24 is displaced to a lower side of a paper plane in FIG. 1.

Figure 7A:
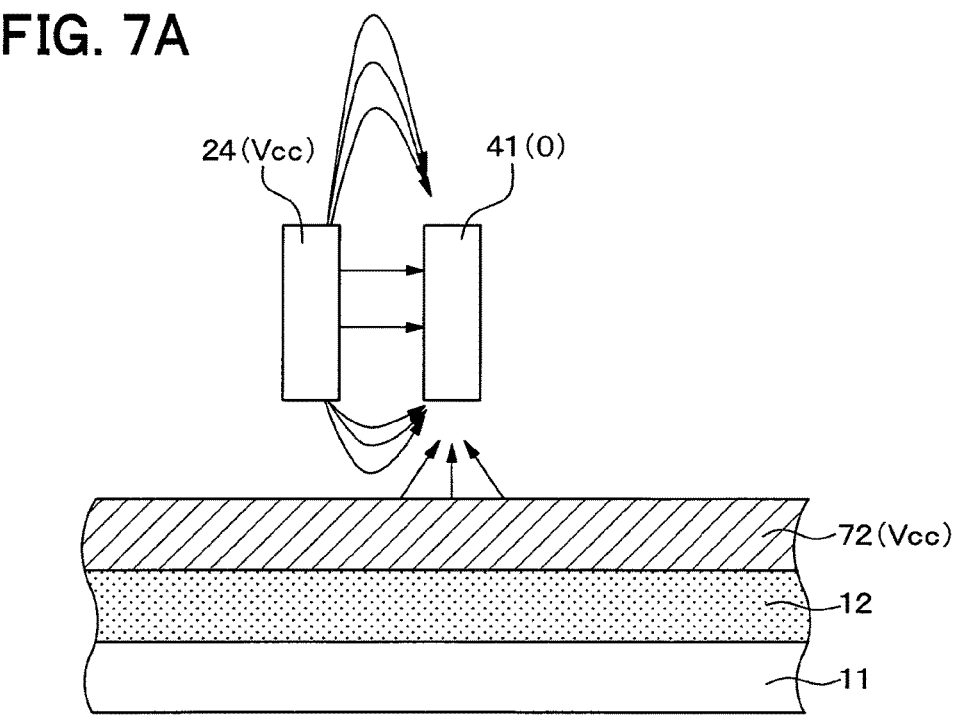
FIG. 7A is a schematic view illustrating electric force lines generated between a movable electrode and a second fixed electrode in the acceleration sensor illustrated in FIG. 1.

In that situation, as described above, the voltage (potential) of Vcc is applied to the second auxiliary electrode 72 as with the first fixed electrode 31. For that reason, as illustrated in FIG. 7A, electric force lines oriented from the second auxiliary electrode 72 toward the second fixed electrode 41 are generated. Therefore, as compared with the acceleration senor (FIG. 7B) having no auxiliary electrode, the electric force lines oriented from the movable electrodes 24 toward the second fixed electrodes 41 adjacent to the second auxiliary electrode 72 are increased in density by the electric force lines oriented from the second auxiliary electrode 72 toward the second fixed electrodes 41. In other words, the electrostatic force between the movable electrodes 24 and the second fixed electrodes 41 becomes larger, and the displacement of the movable electrodes 24 becomes larger.

Figure 7B:
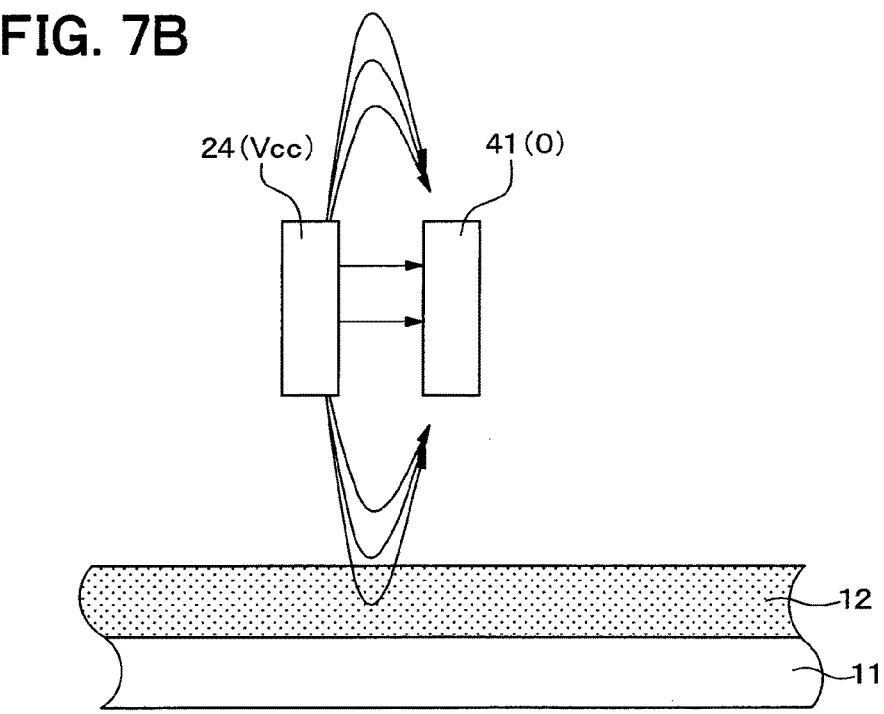
FIG. 7B is a schematic view illustrating the electric force lines generated between the movable electrode and a fixed electrode in the acceleration sensor having no auxiliary electrode.

In FIGS. 7A and 7B, the voltage (potential) to be applied to the movable electrodes 24 is indicated as (Vcc). Thus, the voltages (potentials) to be applied to the respective electrodes are also indicated. The potential difference between the movable electrodes 24 and the second fixed electrodes 41 in that state is Vcc. For that reason, as compared with the normal operation in which the potential difference between the movable electrodes 24 and the second fixed electrodes 41 is Vcc/2, the density of the electric force lines between the movable electrodes 24 and the second fixed electrodes 41 becomes higher.

The movable electrodes 24 and the second fixed electrodes 41 are alternately arrayed. For that reason, although not particularly shown, the electric force lines oriented from the movable electrode 24 toward one second fixed electrode 41 located on an opposite side to another second fixed electrode 41 producing the capacitance CS2 with the interposition of the movable electrode 24 are also generated. The electric force lines are also increased in density by the electric force lines oriented from the second auxiliary electrode 72 toward the second fixed electrode 41.

However, in one movable electrode 24 and two second fixed electrodes 41 which are adjacent to each other through the movable electrode 24, an interval between the movable electrode 24 and the second fixed electrodes 41 configuring the capacitance CS2 is set to be smaller than an interval between the movable electrode 24 and the second fixed electrodes 41 configuring no capacitance CS2. In other words, the interval between the second fixed electrodes 41 located in the direction of displacing the movable electrode 24 and the movable electrodes 24 is set to be shorter than the interval between the second fixed electrodes 41 located in the direction of displacing no movable electrode 24 and the movable electrodes 24. For that reason, the electrostatic force between the second fixed electrodes 41 located in the direction of displacing the movable electrode 24 and the movable electrode largely increases, and the displacement of the movable electrode 24 is largely displaced.

The period ϕ3 is a period for displacing the movable electrode 24, and the switch 112 of the C-V conversion circuit 110 is closed in the period ϕ3. Therefore, the capacitor 113 is reset.

In a period φ4 (for example, 10 μs), the same signal waveform as that in the above period φ1 is applied to the movable electrodes 24, and the first and second fixed electrodes 31 and 41. As a result, the capacitances between the movable electrodes 24 displaced in the period φ3 immediately before, and the first and second fixed electrodes 31, 41 are detected.

In other words, the switch 112 of the C-V conversion circuit 110 is opened from the closed state after the predetermined period (period φ2), and the capacitor 113 is brought into the same state as the acceleration detectable state. In the switch circuit 120, the switch 121 is closed, the switch 122 is opened, and the constant voltage (potential) of Vcc/2 is applied to the movable electrodes 24.

Then, because the movable electrode 24 attracted toward the second fixed electrode 41 is to be returned to an original position in the period φ4, charge is generated in the capacitor 113 of the C-V conversion circuit 110 according to the change in the capacitance. For that reason, the capacitances between the movable electrodes 24 displaced in the period φ3 and the first and second fixed electrodes 31, 41 can be detected.

In the above example, in the period of φ3, the voltage (potential) of Vcc is applied to the first fixed electrodes 31 and the second auxiliary electrode 72, and the voltage (potential) of 0 V is applied to the second fixed electrodes 41 and the first auxiliary electrode 71. Alternatively, in the period of φ3, the voltage (potential) of 0 V may be applied to the first fixed electrodes 21 and the second auxiliary electrode 72, and the voltage (potential) of Vcc may be applied to the second fixed electrodes 41 and the first auxiliary electrode 71. In that case, the movable electrode 24 is attracted toward the first fixed electrode 31 (upper side on the paper plane of FIG. 1) larger in the potential difference. In this situation, although not shown, as in FIG. 7A, electric force lines oriented from the first auxiliary electrode 71 toward the first fixed electrode 31 are generated. For that reason, of the electric force lines oriented from the movable electrodes 24 toward the first fixed electrode 31, the electric force lines adjacent to the first auxiliary electrode 71 are increased in density by the electric force lines oriented from the first auxiliary electrode 71 toward the first fixed electrode 31.

As described above, the diagnostic signal for the self-diagnosis with the period (φ3+φ4) as one period is applied from the switch circuit 120 and the control circuit 130 (signal applying unit) to the movable electrodes 24, the first and second fixed electrodes 31, 41, and the first and second auxiliary electrodes 71, 72 to perform the self-diagnosis.

Then, a method of manufacturing the sensor part 10 will be described in brief with reference to FIGS. 8A to 8F. FIGS. 8A to 8F are cross-sectional views taken along a line II-II in FIG. 1.

Figure 8A:
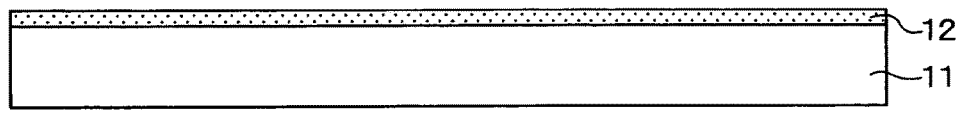
FIG. 8A is a cross-sectional view partially illustrating a process of manufacturing the sensor part illustrated in FIG. 1.

First, as illustrated in FIG. 8A, the first insulating film 12 is formed on the support substrate 11 through a chemical vapor deposition (CVD) technique.

Figure 8B:
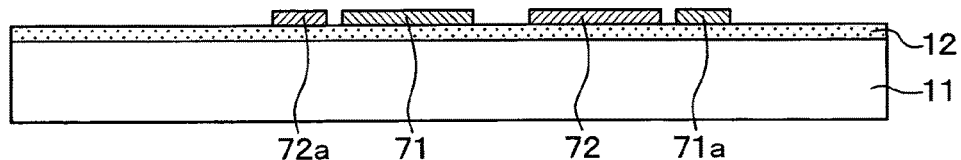
FIG. 8B is a cross-sectional view partially illustrating the process of manufacturing the sensor part illustrated in FIG. 1.

Then, as illustrated in FIG. 8B, a polysilicon or metal film is formed on the first insulating film 12 through a CVD technique. Further, the first and second auxiliary electrodes 71, 72, and the first and second auxiliary electrode lines 71a, 72a are formed by appropriately patterning with a mask not shown, and the movable part line 25 is formed in another cross-section different from FIG. 8B.

Figure 3:
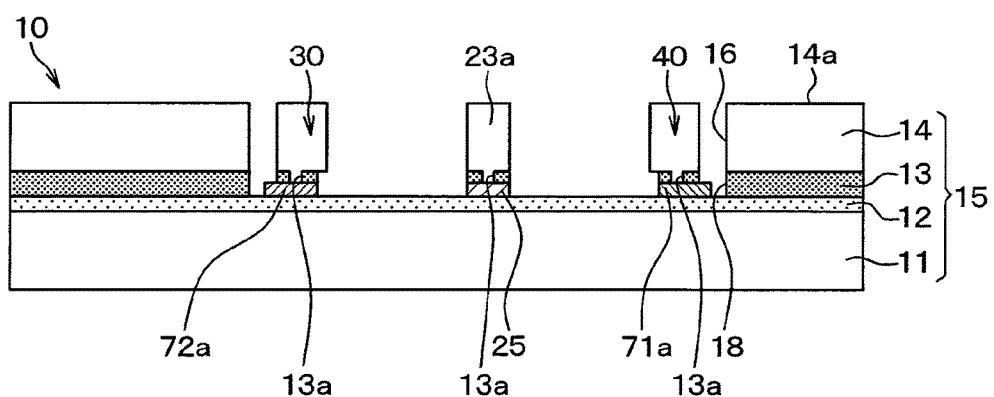
FIG. 3 is a cross-sectional view of the sensor part taken along a line III-III in FIG. 1.
Figure 4:
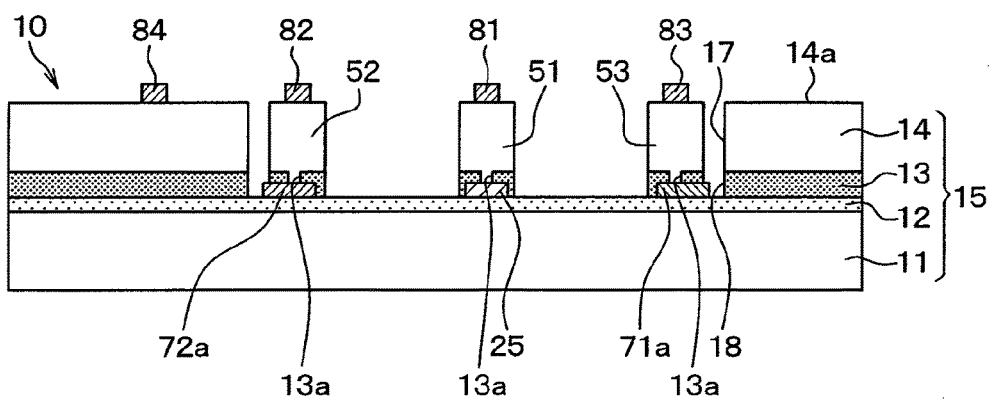
FIG. 4 is a cross-sectional view of the sensor part taken along a line IV-IV in FIG. 1.
Figure 8C:
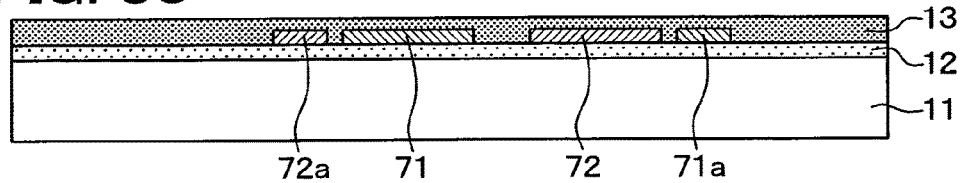
FIG. 8C is a cross-sectional view partially illustrating the process of manufacturing the sensor part illustrated in FIG. 1.

Thereafter, as illustrated in FIG. 8C, the second insulating film 13 is formed through the CVD technique so as to cover the movable part line 25, the first and second wiring parts 71, 72, and the first and second auxiliary electrode lines 71a, 72a. Further, in another cross-section different from FIG. 8C, as illustrated in FIGS. 3 and 4, the contact holes 13a are defined in parts of portions of the second insulating film 13 in which the anchor part 23a, the first and second wiring parts 32, 42, and the connection parts 51 to 53 are formed.

Figure 8D:
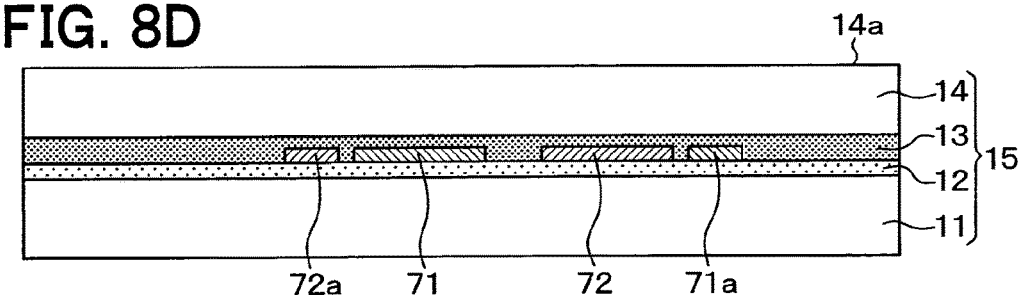
FIG. 8D is a cross-sectional view partially illustrating the process of manufacturing the sensor part illustrated in FIG. 1.

Subsequently, as illustrated in FIG. 8D, the semiconductor layer 14 is formed on the second insulating film 13 through the CVD technique to configure the substrate 15. In that situation, in another cross-section different from FIG. 8D, as illustrated in FIGS. 3 and 4, the semiconductor layer 14 is embedded in the contact holes 13a. Thereafter, in another cross-section different from FIG. 8D, as illustrated in FIG. 4, aluminum is deposited on the semiconductor layer 14, and patterned with the use of a mask, as a result of which the pads 81 to 84 are formed.

Figure 8E:
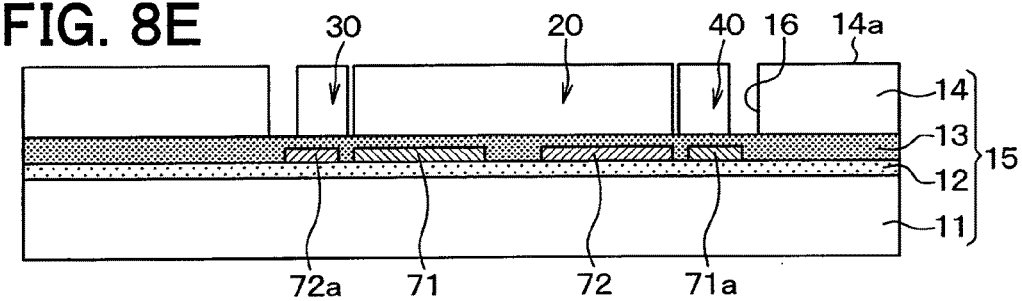
FIG. 8E is a cross-sectional view partially illustrating the process of manufacturing the sensor part illustrated in FIG. 1.

Then, as illustrated in FIG. 8E, with the use of a mask not shown, the first groove portion 16 is defined in the semiconductor layer 14, and the movable part 20, and the first and second fixed portions 30, 40 are partitioned and formed. In another cross-section different from FIG. 8E, the second groove portion 17 is defined in the semiconductor layer 14, and the connection parts 51 to 53 are partitioned and formed.

Figure 8F:
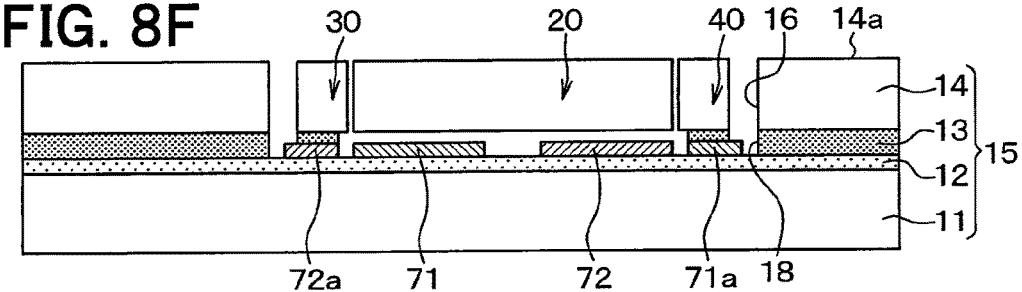
FIG. 8F is a cross-sectional view partially illustrating the process of manufacturing the sensor part illustrated in FIG. 1.

Thereafter, as illustrated in FIG. 8F, with the removal of predetermined regions of the second insulating film 13, the movable part 20, and the first and second fixed electrodes 31, 41 are floated (released) from the support substrate 11 (first insulating film 12), and the first and second auxiliary electrodes 71 and 72 are exposed. With the above process, the sensor part 10 is formed.

As described above, in this embodiment, the first and second auxiliary electrodes 71 and 72 are formed on a portion of the first insulating film 12 which faces the displaceable region of the movable electrode 24. At the time of self-diagnosis, a predetermined voltage (potential) is applied to the first and second auxiliary electrodes 71 and 72 to thereby increase a density of electric force lines generated between the first and second fixed electrodes 31 and 41 located in a direction of displacing the movable electrode 24 and the movable electrode 24. That is, during the self-diagnosis, an electrostatic force generated between the first and second fixed electrodes 31 and 41 located in a direction of displacing the movable electrode 24 and the movable electrode 24 can increase, and the displacement of the movable electrode 24 can increase. Therefore, appropriate self-diagnosis can be performed.

(Second Embodiment)

A second embodiment of the present disclosure will be described. In this embodiment, a shape of first and second auxiliary electrodes 71 and 72 is changed as compared with the first embodiment. The other configurations are identical with those in the first embodiment, and therefore their description will be omitted.

Figure 9:
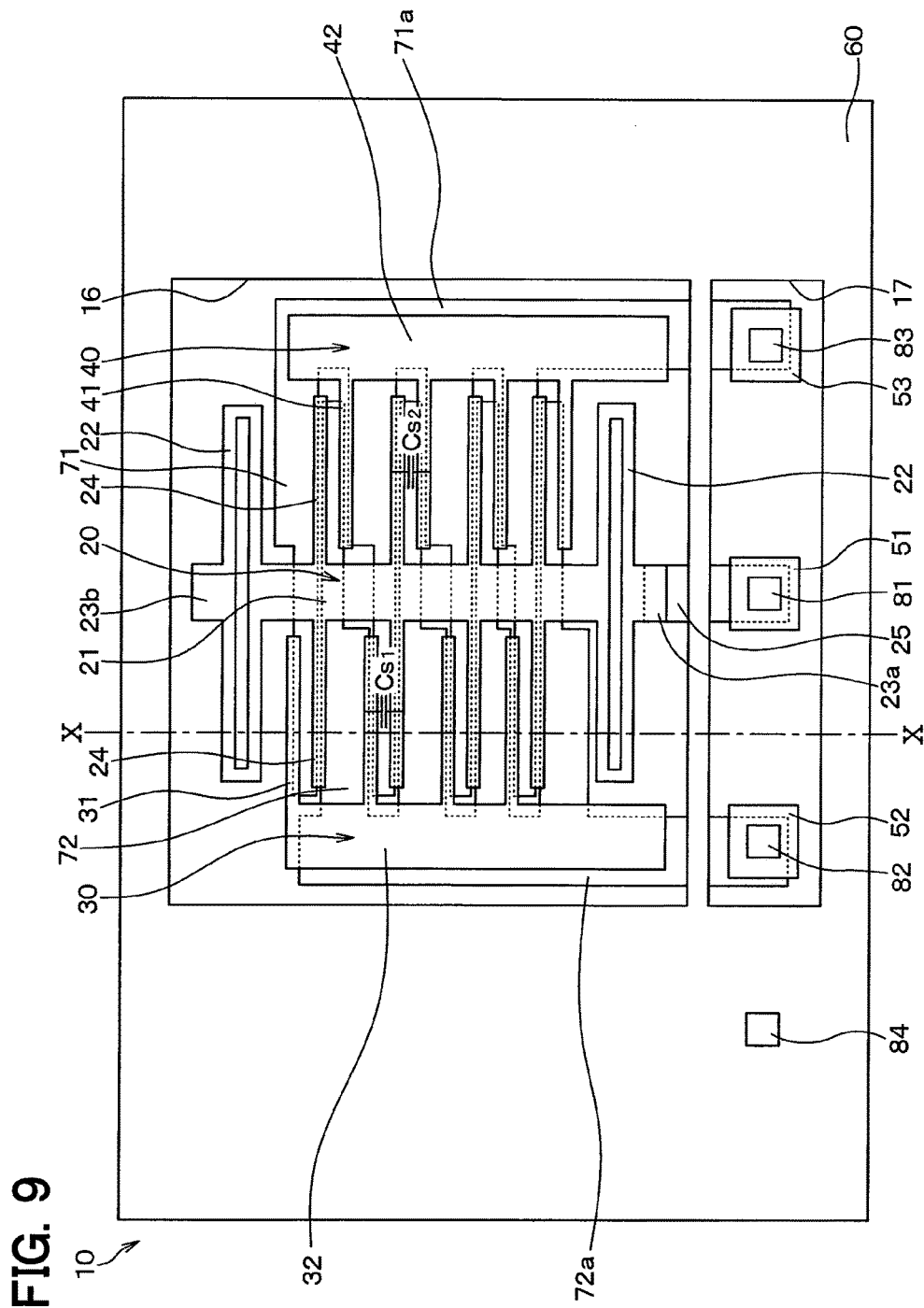
FIG. 9 is a top view of a sensor part according to a second embodiment of the present disclosure.
Figure 10:
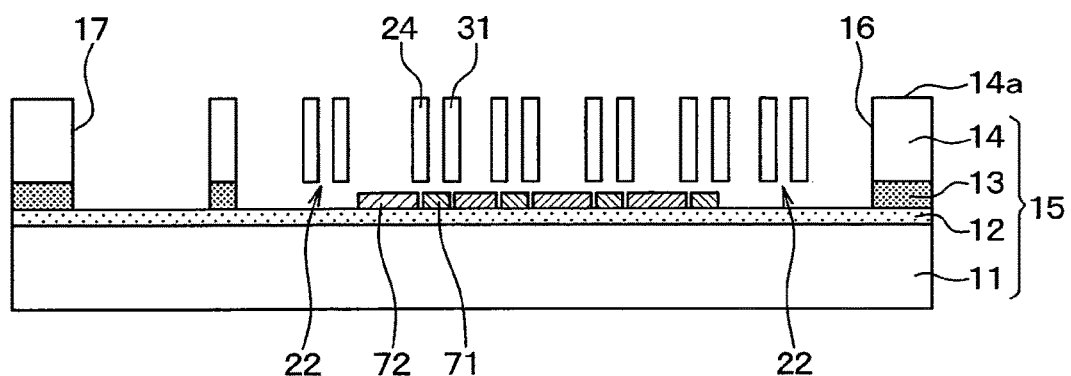
FIG. 10 is a cross-sectional view of the sensor part taken along a line X-X in FIG. 9.

As illustrated in FIGS. 9 and 10, first and second auxiliary electrodes 71 and 72 according to this embodiment are alternately arrayed along a longitudinal direction of a weight part 21 (vertical direction on a paper plane in FIG. 9) into a pectinate shape, and formed four by four.

Specifically, three of the first auxiliary electrodes 71 adjacent to the anchor part 23a are each formed to face a space between the movable electrode 24 and the first or second fixed electrode 31, 41 that faces the movable electrode 24 and is located adjacent to the anchor part 23b than the movable electrode 24. Those first auxiliary electrodes 71 are each formed to also face a portion of the movable electrode 24 on a side adjacent to the anchor part 23b, and a portion of the first or second fixed electrode 31, 41 on a side adjacent to the anchor part 23a.

One of the first auxiliary electrodes 71 which is located closest to the anchor part 23b is formed to face a space between the movable electrode 24 and the first fixed electrode 31 that faces the movable electrode 24 and is located adjacent to the anchor part 23b than the movable electrode 24. The first auxiliary electrode 71 is formed to face a portion of the movable electrode 24 adjacent to the anchor part 23b, and a portion of the first fixed electrode 31 adjacent to the anchor part 23a.

Three of the second auxiliary electrodes 72 adjacent to the anchor part 23b are each formed to face a space between the movable electrode 24 and the first or second fixed electrode 31, 41 that faces the movable electrode 24 and is located adjacent to the anchor part 23a than the corresponding movable electrode 24. Those second auxiliary electrodes 72 are each formed to also face a portion of the movable electrode 24 adjacent to the anchor part 23a, and a portion of the first or second fixed electrode 31, 41 adjacent to the anchor part 23b.

One of the second auxiliary electrodes 72 which is located closest to the anchor part 23b is formed to face a space between the movable electrode 24 and the second fixed electrode 41 that faces the movable electrode 24 and is located adjacent to the anchor part 23a than the movable electrode 24. The second auxiliary electrode 72 is formed to face a portion of the movable electrode 24 on a side adjacent to the anchor part 23a, and a portion of the second fixed electrode 41 on a side adjacent to the anchor part 23b.

Figure 11:
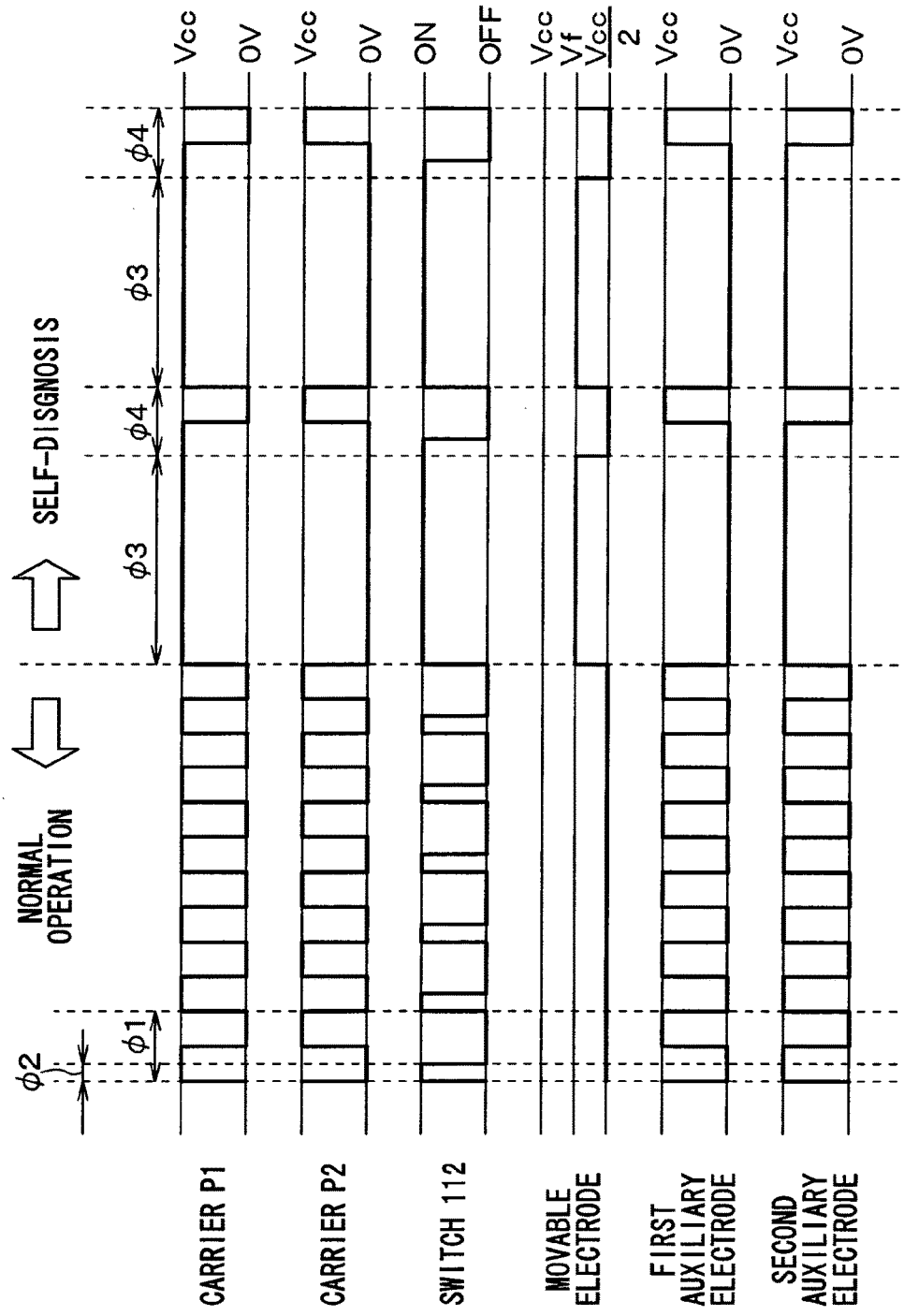
FIG. 11 is a timing chart of an acceleration sensor illustrated in FIG. 9.

As illustrated in FIG. 11, in the period of ϕ3 during the self-diagnosis (period during which the movable electrode 24 is displaced), the voltage (potential) of Vcc is applied to the first fixed electrodes 31 and the second auxiliary electrode 72, and the voltage (potential) of 0V is applied to the second fixed electrodes 41 and the first auxiliary electrode 71. A voltage (potential) of Vf larger than Vcc/2 and smaller than Vcc is applied to the movable electrode 24 through the switch 121 in FIG. 5. In that case, like the above manner, the movable electrode 24 is displaced toward the second fixed electrode 41 side (lower side on a paper plane in FIG. 9) large in potential difference.

Figure 12A:
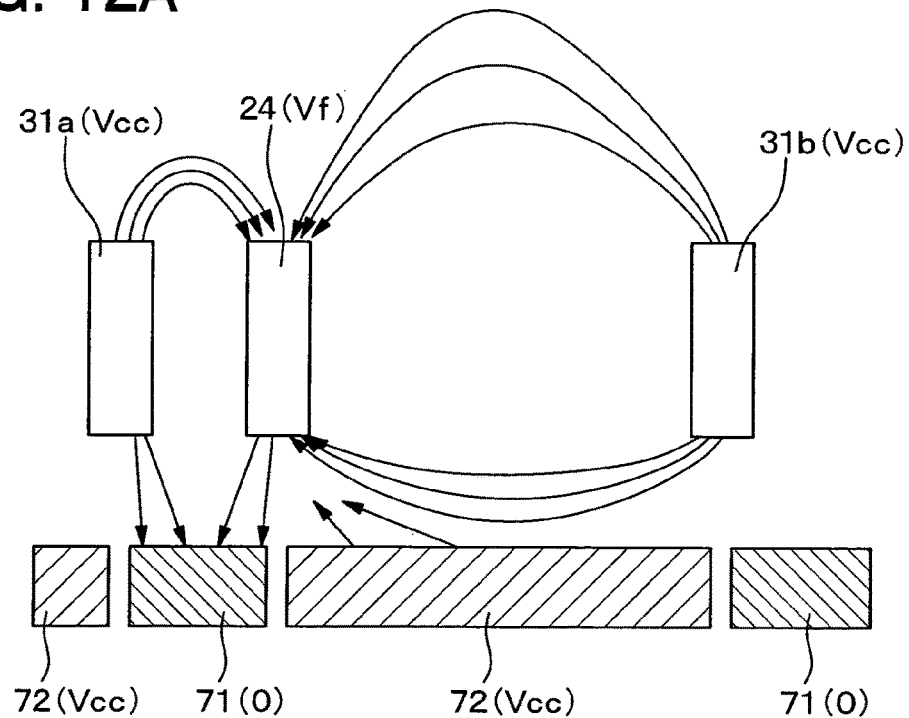
FIG. 12A is a schematic view illustrating electric force lines generated between a movable electrode and a first fixed electrode in the acceleration sensor illustrated in FIG. 9.
Figure 12B:
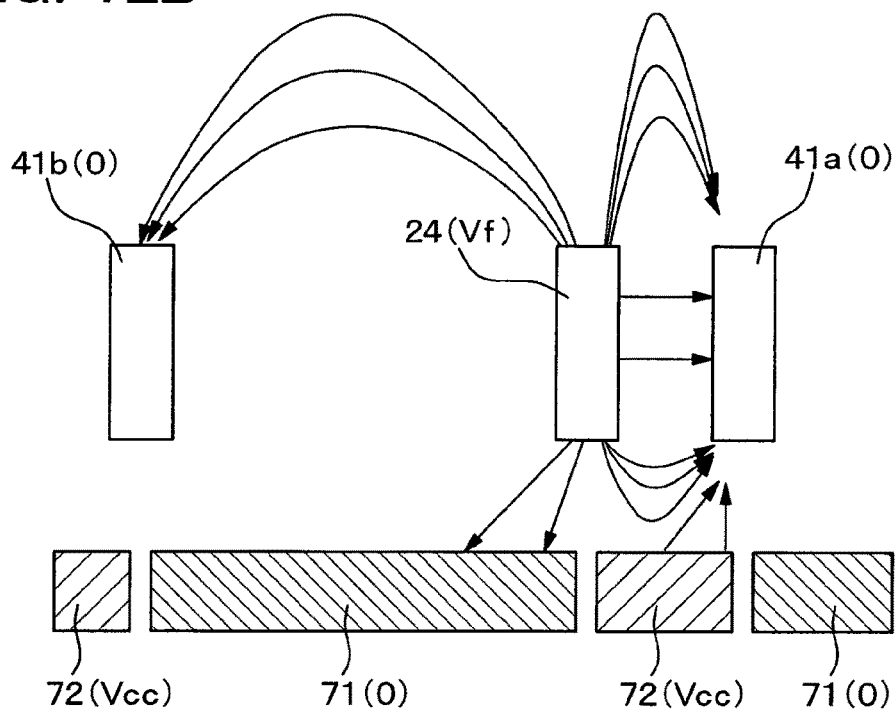
FIG. 12B is a schematic view illustrating the electric force lines generated between the movable electrode and a second fixed electrode in the acceleration sensor illustrated in FIG. 9.

The displacement of the movable electrode 24 in the period of ϕ3 during the self-diagnosis will be described with reference to FIGS. 12A and 12B. FIG. 12A illustrates a relationship between one movable electrode 24 and two first fixed electrodes 31 located with the movable electrodes 24 interposed therebetween. Likewise, FIG. 12B illustrates a relationship between one movable electrode 24 and two second fixed electrodes 41 located with the movable electrodes 24 interposed therebetween. In FIG. 12A, the first fixed electrode 31 configuring the capacitance CS1 in cooperation with the movable electrodes 24 in FIG. 12A is set as a first fixed electrode 31a, and another first fixed electrode 31 disposed on an opposite side to the first fixed electrode 31a with the movable electrodes 24 interposed therebetween is set as a first fixed electrode 31b. Likewise, in FIG. 12B, the second fixed electrode 41 configuring the capacitance CS2 in cooperation with the movable electrodes 24 in FIG. 12B is set as a second fixed electrode 41a, and another second fixed electrode 41 disposed on an opposite side to the second fixed electrode 41a with the movable electrodes 24 interposed therebetween is set as a second fixed electrode 41b. In FIGS. 12A and 12B, the voltage (potential) to be applied to the movable electrodes 24 is indicated as (Vf). Thus, the voltages (potentials) to be applied to the respective electrodes are also indicated.

As illustrated in FIG. 12A, because the voltage (potential) of Vf is applied to the movable electrode 24, and the voltage (potential) of Vcc is applied to the first fixed electrodes 31a and 31b, the electric force lines oriented from the first fixed electrodes 31a and 31b toward the movable electrode 24 are generated.

In that situation, the voltage (potential) of 0 V is applied to the first auxiliary electrode 71. For that reason, the electric force lines oriented from the movable electrode 24 and the first fixed electrode 31a toward the first auxiliary electrode 71 are generated adjacent to the first auxiliary electrode 71 between the movable electrode 24 and the first fixed electrode 31a. In other words, as compared with the conventional acceleration senor having no auxiliary electrode, the density of the electric force lines between the movable electrode 24 and the first fixed electrode 31a decreases.

On the contrary, because the voltage (potential) of Vcc is applied to the second auxiliary electrode 72, the electric force lines oriented from the second auxiliary electrode 72 toward the movable electrode 24 are generated. For that reason, the electric force lines oriented from the first fixed electrode 31b toward the movable electrodes 24 are increased in density by the electric force lines oriented from the second auxiliary electrode 72 toward the movable electrode 24, adjacent to the second auxiliary electrode 72 between the movable electrode 24 and the first fixed electrode 31b.

As illustrated in FIG. 12B, because the voltage (potential) of Vf is applied to the movable electrode 24, and the voltage (potential) of 0 V is applied to the second fixed electrodes 41a and 41b, the electric force lines oriented from the movable electrode 24 toward the second fixed electrodes 41a and 41b are generated.

In that situation, because the voltage (potential) of Vcc is applied to the second auxiliary electrode 72, the electric force lines oriented from the second auxiliary electrode 72 toward the second fixed electrode 41a are generated. For that reason, the electric force lines oriented from the movable electrodes 24 toward the second fixed electrode 41a are increased in density by the electric force lines oriented from the second auxiliary electrode 72 toward the second fixed electrode 41a adjacent to the second auxiliary electrode 72 between the movable On the contrary, the voltage (potential) of 0 V is applied to the first auxiliary electrode 71. For that reason, the electric force lines oriented from the movable electrode 24 toward the first auxiliary electrode 71 are generated adjacent to the first auxiliary electrode 71 between the movable electrode 24 and the second fixed electrode 41b. In other words, as compared with the conventional acceleration senor having no auxiliary electrode, the density of the electric force lines between the movable electrode 24 and the second fixed electrode 41b decreases.

A potential difference between the movable electrode 24 and the first fixed electrode 31a in that state is (Vcc-Vf). However, because the voltage (potential) of 0 V is applied to the first auxiliary electrode 71, the density of the electric force lines between the movable electrodes 24 and the first fixed electrode 31a becomes lower as compared with the normal operation. Likewise, a potential difference between the movable electrode 24 and the first fixed electrode 31b is (Vcc-Vf). However, because the voltage (potential) of Vcc is applied to the second auxiliary electrode 72, the density of the electric force lines between the movable electrodes 24 and the first fixed electrode 31b becomes higher as compared with the normal operation.

As described above, according to the acceleration senor, the density of the electric force lines generated between the first and second fixed electrodes 31b and 41a located in a direction of displacing the movable electrode 24, and the movable electrodes 24 can be increased. The density of the electric force lines generated between the first and second fixed electrodes 31a and 41b located in an opposite direction to the direction of displacing the movable electrodes 24, and the movable electrodes 24 can be reduced. In other words, the electrostatic force between the movable electrodes 24 and the first and second fixed electrodes 31a, 41b can be reduced while the electrostatic force between the movable electrodes 24 and the first and second fixed electrodes 31b, 41a increases. For that reason, the displacement of the movable electrodes 24 can be further increased, and the appropriate self-diagnosis can be performed.

In the above example, in the period of ϕ3, the voltage (potential) of Vcc is applied to the first fixed electrodes 31 and the second auxiliary electrode 72, and the voltage (potential) of 0 V is applied to the second fixed electrodes 41 and the first auxiliary electrode 71. Alternatively, as in the above first embodiment, in the period of ϕ3, the voltage (potential) of 0V may be applied to the first fixed electrodes 31 and the second auxiliary electrode 72, and the voltage (potential) of Vcc may be applied to the second fixed electrodes 41 and the first auxiliary electrode 71.

(Third Embodiment)

A third embodiment of the present disclosure will be described. In this embodiment, a cap part is provided in the first embodiment, and the other configurations are identical with those in the first embodiment, and their description will be omitted.

Figure 13:
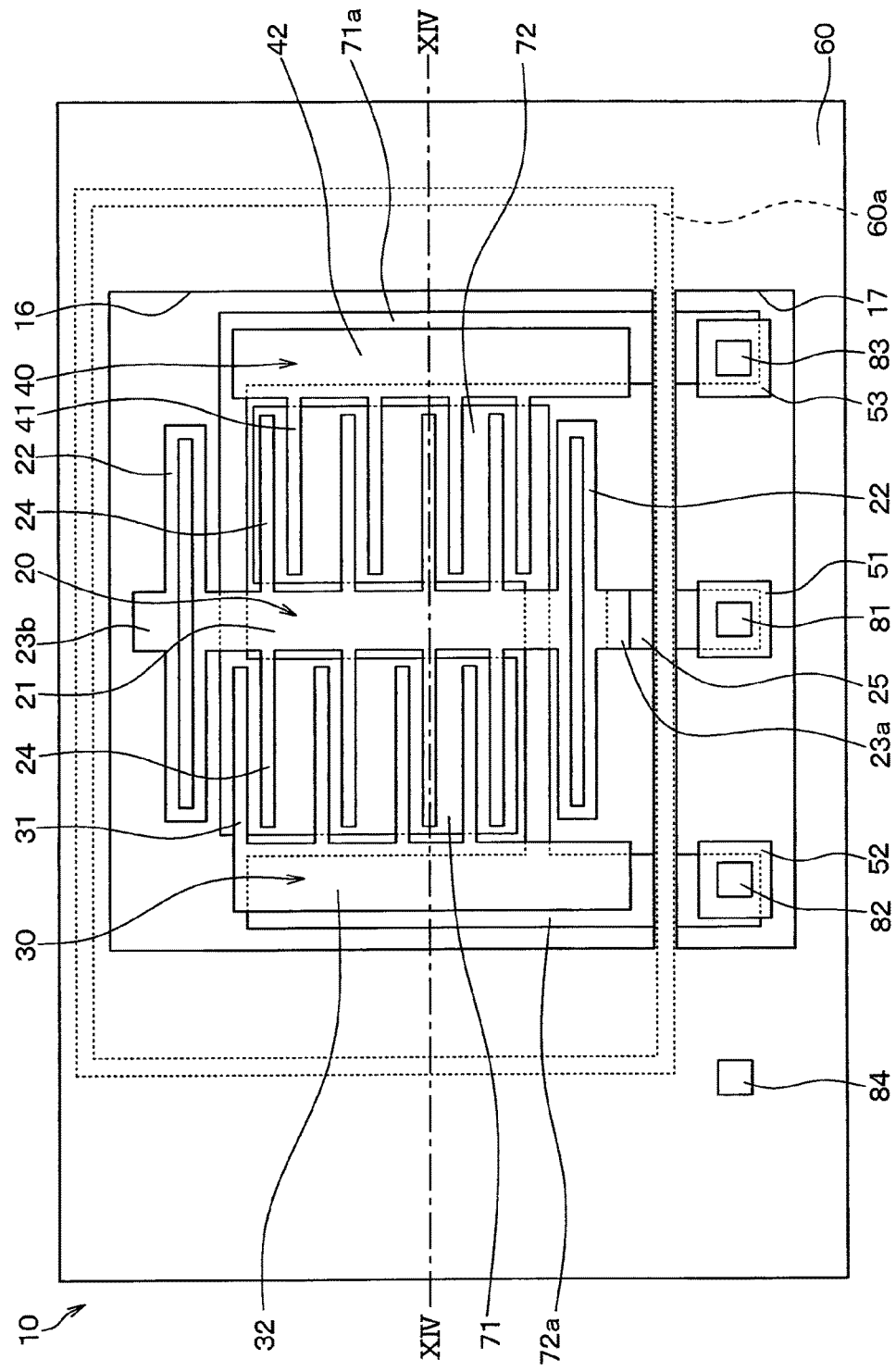
FIG. 13 is a top view of a sensor part according to a third embodiment of the present disclosure.
Figure 14:
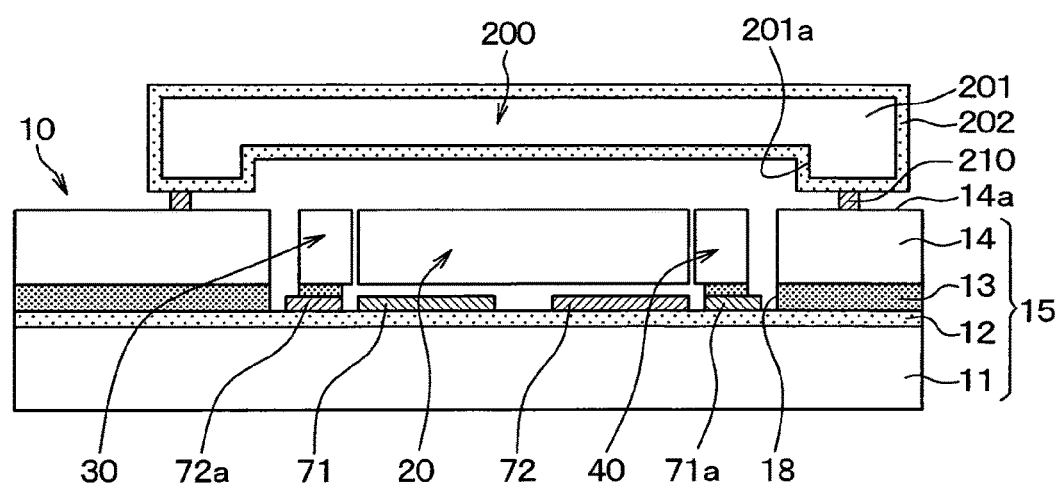
FIG. 14 is a cross-sectional view of the sensor part and a cap part taken along a line XIV-XIV in FIG. 13.

As illustrated in FIGS. 13 and 14, in this embodiment, a cap part 200 is provided in the sensor part 10 to seal the movable part 20 and the first and second fixed electrodes 30, 40.

Specifically, the cap part 200 has a laminated substrate 201 such as a silicon substrate, and a concave portion 201a is defined in a portion facing the movable electrodes 24, and the first and second fixed electrodes 31, 41 in the laminated substrate 201. An insulating film 202 is formed on the overall surface of the laminated substrate 201. The insulating film 202 is also formed on a wall surface of the concave portion 201a.

The cap part 200 is joined to a joint part 60a in the peripheral part 60 of the sensor part 10 through a joint member 210. The joint member 210 is formed of, for example, an oxide film, a low dielectric glass, or metal.

According to the above configuration, the same advantages as those in the above first embodiment can be obtained while a foreign matter is restrained from adhering to the movable part 20, and the first and second fixed parts 30, 40.

(Fourth Embodiment)

A fourth embodiment of the present disclosure will be described. In this embodiment, first and second auxiliary electrodes 71 and 72 are formed in a cap part 200 in the third embodiment, the other configurations are identical with those in the third embodiment, and therefore their description will be omitted.

Figure 15:
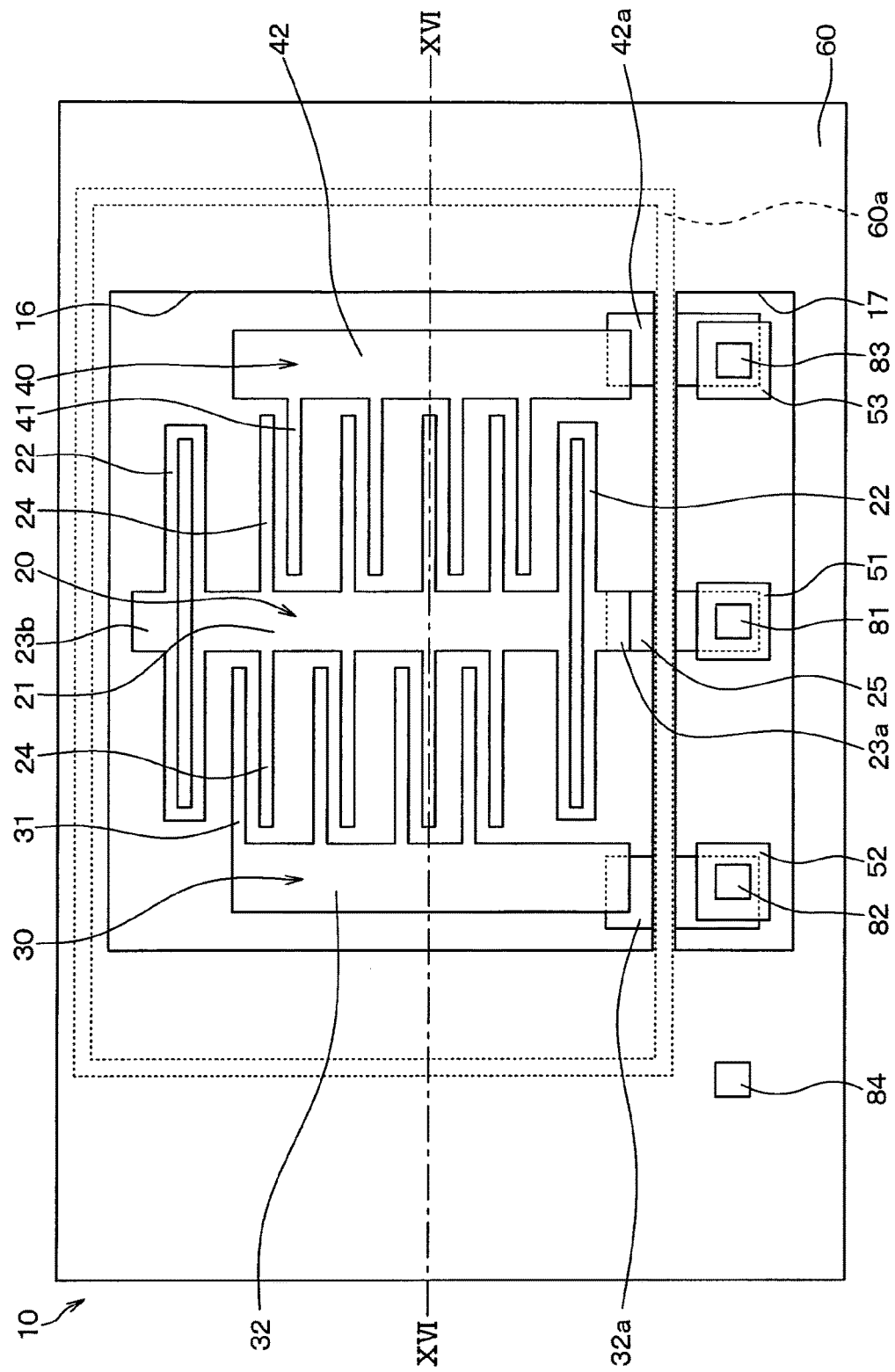
FIG. 15 is a top view of a sensor part according to a fourth embodiment of the present disclosure.
Figure 16:
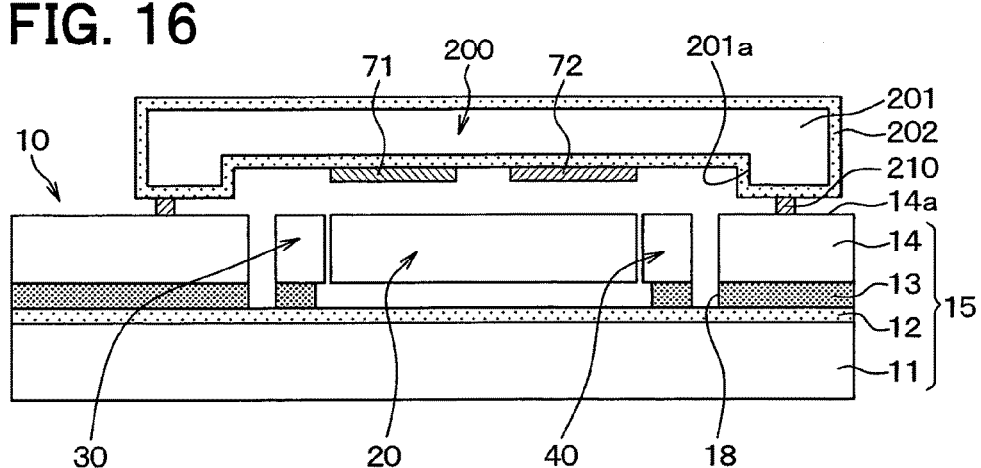
FIG. 16 is a cross-sectional view of the sensor part and a cap part taken along a line XVI-XVI in FIG. 15.

As illustrated in FIGS. 15 and 16, in the cap 200 of this embodiment, the first and second auxiliary electrodes 71 and 72 are formed on a portion of the insulating film 202 which faces the displaceable region of the movable electrode 24.

In another cross-section different from that in FIG. 15, through electrode parts electrically connected to the first and second auxiliary electrodes 71 and 72 are formed in the cap part 200. As with the above, the same voltage (potential) as that of the second fixed electrodes 41 is applied to the first auxiliary electrode 71, and the same voltage (potential) as that of the first fixed electrode 31 is applied to the second auxiliary electrode 72, through the through electrode parts.

Further, first and second fixed electrode wires 32a and 42a corresponding to the above first and second auxiliary electrode lines 71a and 72a are formed on the first insulating film 12. The first and second wiring parts 32 and 42 are connected to the connection parts 52 and 53 through the first and second fixed electrode wires 32a and 42a, respectively.

In this embodiment, the substrate 15 corresponds to a first substrate, and the laminated substrate 201 corresponds to a second substrate.

According to the above configuration, the same advantages as those in the above second embodiment can be obtained while the density of the electric force lines generated between the first and second fixed electrodes 31, 41 located in a direction of displacing the movable electrode 24, and the movable electrode 24 adjacent to the cap part 200 increases.

(Fifth Embodiment)

A fifth embodiment of the present disclosure will be described. In this embodiment, the convex portion is provided on the laminated substrate 201 as compared with the fourth embodiment. The other configurations are identical with those in the fourth embodiment, and therefore their description will be omitted.

Figure 17:
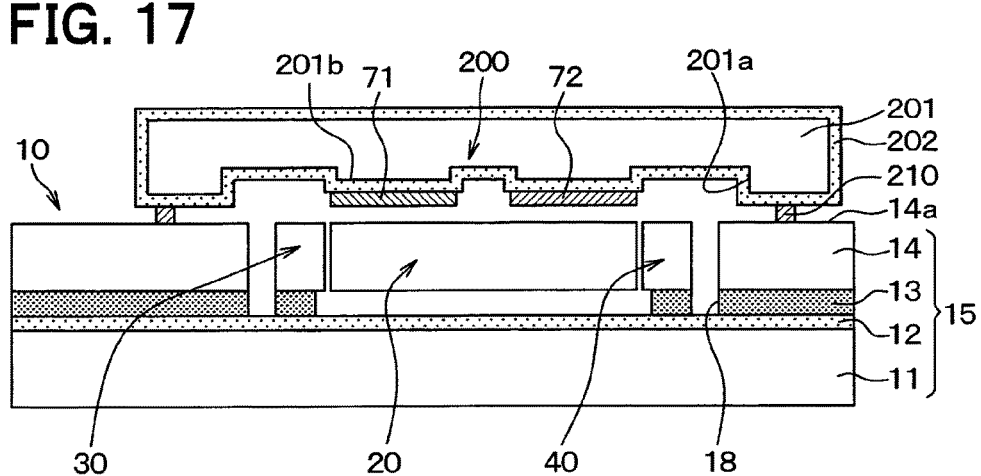
FIG. 17 is a cross-sectional view of a sensor part and a cap part according to a fifth embodiment of the present disclosure.

As illustrated in FIG. 17, in this embodiment, a convex portion 201b is defined in a portion of a bottom of a concave portion 201a of a laminated substrate 201, which faces the displaceable region of the movable electrode 24. The first and second auxiliary electrodes 71 and 72 are formed on a tip end surface of the convex portion 201b in the projecting direction.

According to the above configuration, intervals between the movable electrodes 24 and the first and second auxiliary electrodes 71, 72 can be narrowed. For that reason, the same advantages as those in the above fourth embodiment can be obtained while the density of the electric force lines generated between the first and second fixed electrodes 31, 41 located in a direction of displacing the movable electrode 24, and the movable electrode 24 adjacent to the cap part 200 further increases.

In the example described above, the convex portion 201b is defined in the laminated substrate 201. For example, in the above first embodiment, the first insulating film 12 may be partially thickened to configure a convex portion, and the first and second auxiliary electrodes 71 and 72 may be formed on the tip end surface of the convex portion in the projecting direction. In the above first embodiment, the support substrate 11 may be partially removed to form the convex portion.

(Sixth Embodiment)

A sixth embodiment of the present disclosure will be described. In this embodiment, first and second auxiliary electrodes 71 and 72 are formed in a sensor part 10 in the fourth embodiment, the other configurations are identical with those in the fourth embodiment, and therefore their description will be omitted.

Figure 18:
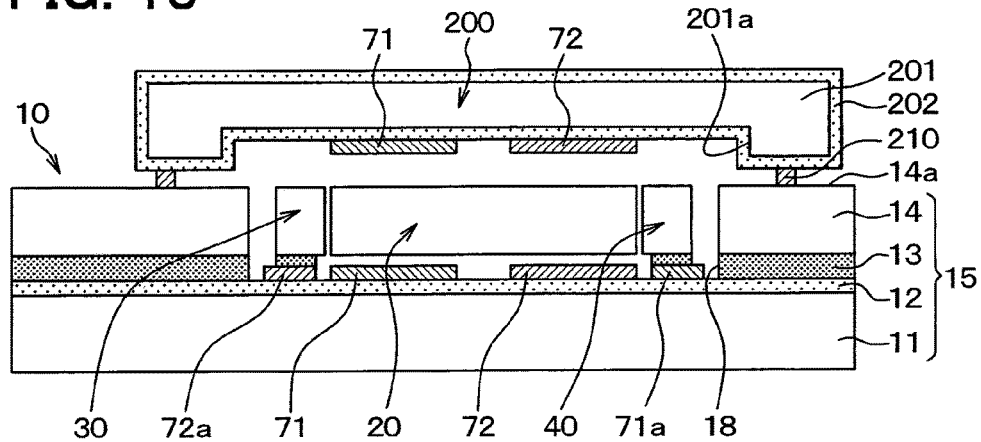
FIG. 18 is a cross-sectional view of a sensor part and a cap part according to a sixth embodiment of the present disclosure.

As illustrated in FIG. 18, in this embodiment, the first and second auxiliary electrodes 71 and 72 are formed in a sensor part 10 and a cap part 200, respectively. In this embodiment, a support substrate 11 and a laminated substrate 201 correspond to a second substrate.

According to the above configuration, the same advantages as those in the above fourth embodiment can be obtained while the densities of the electric force lines generated between the first and second fixed electrodes 31, 41 located in a direction of displacing the movable electrode 24, and the movable electrode 24 adjacent to the support substrate 11 and the cap part 200 increase.

(Seventh Embodiment)

A seventh embodiment of the present disclosure will be described. this embodiment changes the structures of the sensor part 10 and the cap part 200 in the fourth embodiment, the other configurations are identical with those in the fourth embodiment, and therefore their description will be omitted.

Figure 19:
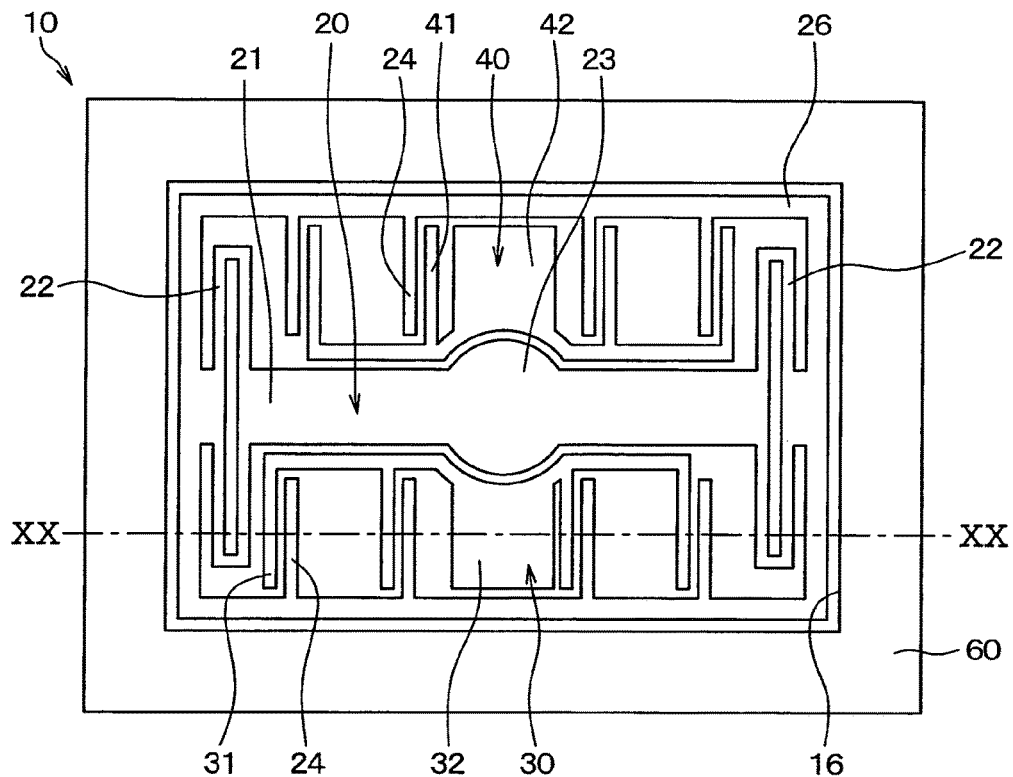
FIG. 19 is a top view of a sensor part according to a seventh embodiment of the present disclosure.
Figure 20:
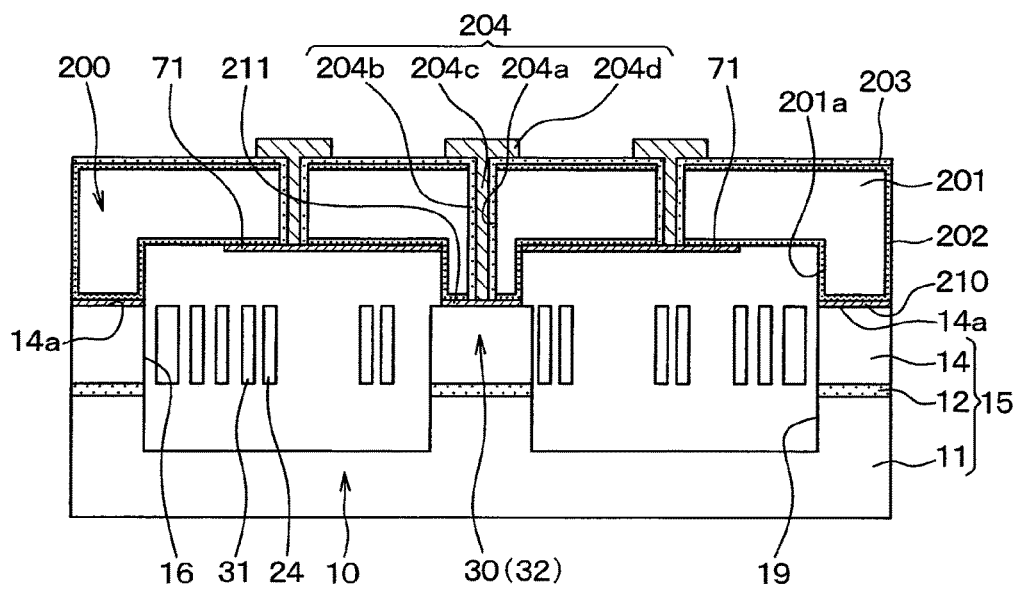
FIG. 20 is a cross-sectional view of the sensor part and a cap part taken along a line XX-XX in FIG. 19.

As illustrated in FIGS. 19 and 20, in this embodiment, an insulating film 12 and a semiconductor layer 14 are disposed on a support substrate 11 in order to configure a substrate 15. A recess 19 is defined in portions corresponding to the support substrate 11, and movable electrodes 24, and first and second fixed electrodes 31 and 41 in the insulating film 12. The recess 19 restricts the movable electrodes 24, and the first and second fixed electrodes 31 and 41 from coming into contact with the support substrate 11.

The movable part 20 is disposed to cross on the recess 19, and configured so that both ends of a weight part 21 in a longitudinal direction are coupled integrally with a frame part 26 shaped into a rectangular frame through beam parts 22. As with the first wiring part 32 in FIG. 19, the movable part 20 is supported to the support substrate 11 through the insulating film 12 in an anchor part 23 located substantially in the center of the weight part 21.

In the cap part 200, a concave portion 201a is defined in portions of the laminated substrate 201 which face the movable electrodes 24, and the first and second fixed electrodes 31, 41, and portions facing the anchor part 23, and the first and second wiring parts 32 and 42 are not concaved.

A connection line 211 is formed on a portion facing the first wiring part 32 in the insulating film 202. In another cross-section different from FIG. 20, the connection lines 211 are also formed on portions facing the anchor part 23 and the second wiring part 42. The respective connection lines 211 are connected to the anchor part 23, and the first and second wiring parts 32, 42.

Further, an insulating film 203 is formed on a side of the insulating film 202 opposite to the sensor part 10. Through electrode parts 204 electrically connected to the first and second auxiliary electrodes 71, 72, and the respective connection lines 211 are formed in the cap part 200. Specifically, the through electrode parts 204 have a through-hole 204a that passes through the insulating film 203, the insulating film 202, and the laminated substrate 201, and reaches the first and second auxiliary electrodes 71, 72, or the connection lines 211. A through-electrode 204c is embedded in the through-hole 204a through an insulating film 204b, and a pad 204d electrically connected to the through-electrode 204c is formed on the insulating film 203.

As with the above configuration, the same voltage (potential) as that of the second fixed electrodes 41 is applied to the first auxiliary electrode 71, and the same voltage (potential) as that of the first fixed electrode 31 is applied to the second auxiliary electrode 72.

The same advantages as those in the above fourth embodiment can be obtained because the first and second auxiliary electrodes 71 and 72 are formed even as the acceleration sensor using the sensor part 10 and the cap part 200 described above.

(Other Embodiments)

The present disclosure is not limited to the above embodiments, but can appropriately change within a scope of the claims.

For example, in the above respective embodiments, the first and second fixed electrodes 31 and 41 may be electrically isolated from the first and second auxiliary electrodes 71 and 72, and independent voltages (potentials) may be applied to the first and second auxiliary electrodes 71 and 72. In that case, a predetermined potential may be applied to the first and second auxiliary electrodes 71 and 72 only at the time of self-diagnosis.

In the above respective embodiments, the voltage (potential) of Vcc is input through the switch 122. The voltage (potential) input through the switch 122 can be appropriately changed. In other words, for example, in the period of $\phi 3$ at the time of the self-diagnosis according to the first embodiment, as with the second embodiment, the voltage (potential) of Vf may be applied to the movable electrodes 24. Likewise, in the period of $\phi 3$ at the time of the self-diagnosis according to the second embodiment, the voltage (potential) of Vcc may be applied to the movable electrodes 24.

In the above respective embodiments, the support substrate 11 may be made of glass.

Further, in the above respective embodiments, the acceleration sensor as the capacitive physical quantity sensor has been exemplified. The present disclosure can be applied to an angular velocity sensor or a pressure sensor.

In the above respective embodiments, the second fixed electrodes 41 may not be provided. In other words, an acceleration senor that detects acceleration on the basis of only the capacitance CS1 between the movable electrode 24 and the first fixed electrode 31 may be applied.

Further, the above respective embodiments can be combined together. For example, the first and fifth embodiments may be combined with the sixth and seventh embodiments, and the first and second auxiliary electrodes 71 and 72 may be arranged on the tip end surface of the convex portion 201b in the projecting direction. Further, the sixth embodiment may be combined with the seventh embodiment, and the first and second auxiliary electrodes 71 and 72 may be arranged on a bottom of the recess 19 in the support substrate 11. Further, the second embodiment may be combined with the third to seventh embodiments, and the first and second auxiliary electrodes 71 and 72 may be formed into a pectinate shape. Further, the respective combinations of the above respective embodiments may be further combined together.

The invention claimed is:

1. A capacitive physical quantity sensor comprising:
   a first substrate that has a surface;
   a movable electrode that is disposed adjacent to the surface of the first substrate, and formed integrally with a beam part which is displaceable in a predetermined direction in a planar direction of the surface of the first substrate by application of a physical quantity;
   a fixed electrode that is disposed adjacent to the surface of the first substrate in a state to face the movable electrode;
   a second substrate that is joined to the first substrate;
   a signal applying unit that applies a diagnostic signal for self-diagnosis which displaces the movable electrode between the movable electrode and the fixed electrode at the time of the self-diagnosis;
   a C-V conversion circuit that outputs a voltage corresponding to a change in a capacitance between the movable electrode and the fixed electrode when the diagnostic signal is applied to the movable electrode and the fixed electrode; and
   an auxiliary electrode that is disposed from a portion of the second substrate opposite to the movable electrode to a portion of the second substrate opposite to a displaceable region of the movable electrode, wherein during a normal operation, the capacitive physical quantity sensor outputs a voltage corresponding to the change in the capacitance between the fixed electrode and the movable electrode, and the signal applying unit applies a predetermined potential to the auxiliary electrode during the self-diagnosis to make a density of electric force lines generated between the fixed electrode located in a direction of displacing the movable electrode and the movable electrode higher than the density of electric force lines generated between the fixed electrode and the movable electrode during the normal operation.

2. The capacitive physical quantity sensor according to claim 1, wherein
a plurality of the movable electrodes and a plurality of the fixed electrodes are alternately arrayed, and
in one of the movable electrodes and two of the fixed electrodes adjacent to each other through the one movable electrode, an interval between one of the fixed electrodes and the movable electrode is set to be smaller than an interval between the other of the fixed electrodes and the movable electrode.

3. The capacitive physical quantity sensor according to claim 2, wherein
the auxiliary electrode includes a first auxiliary electrode that faces the movable electrode when the movable electrode is displaced in one direction in the predetermined direction, and a second auxiliary electrode that faces the movable electrode when the movable electrode is displaced in an opposite direction to the one direction, and
the signal applying unit applies a predetermined potential to the first auxiliary electrode, and applies a potential different from the predetermined potential to the second auxiliary electrode at the time of the self-diagnosis to make a density of electric force lines generated between the fixed electrode located in a direction of displacing the movable electrode and the movable electrode higher than the density of electric force lines generated between the fixed electrode and the movable electrode during the normal operation, and make the density of electric force lines generated between the fixed electrode and the movable electrode, which are located in an opposite direction to the direction of displacing the movable electrode, lower than the density of electric force lines generated between the fixed electrode and the movable electrode during the normal operation.

4. The capacitive physical quantity sensor according to claim 1, wherein
the second substrate is disposed adjacent to another surface of the first substrate opposite to the surface of the first substrate, and supports the first substrate.

5. The capacitive physical quantity sensor according to claim 1, wherein
the first substrate is a substrate in which an insulating film and a semiconductor layer are disposed on the support substrate in order, and
the second substrate is disposed adjacent to the surface of the first substrate, and seals the movable electrode and the fixed electrode.

6. The capacitive physical quantity sensor according to claim 1, wherein
the second substrate is one of two second substrates,
one of the two second substrates is disposed adjacent to the surface of the first substrate, and seals the movable electrode and the fixed electrode, and the other of the two second substrates is disposed adjacent to an opposite side to the surface of the first substrate, and supports the first substrate, and
the auxiliary electrode is disposed on each of the two second substrates.

7. The capacitive physical quantity sensor according to claim 1, wherein
the second substrate has a convex portion projecting toward the first substrate, and
the auxiliary electrode is arranged on a tip end surface of the convex portion in a projecting direction.

8. The capacitive physical quantity sensor according to claim 1, wherein
the first substrate is provided with a movable part including the movable electrode, and first and second fixed parts each having the fixed electrode, and
the first and second fixed parts are disposed at opposite sides of the movable part.

* * * * *